United States Patent
Horiuchi et al.

(10) Patent No.: US 9,904,206 B2
(45) Date of Patent: Feb. 27, 2018

(54) IMAGE FORMING APPARATUS

(71) Applicant: CANON KABUSHIKI KAISHA, Tokyo (JP)

(72) Inventors: Izuru Horiuchi, Tokyo (JP); Yasutomo Furuta, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/356,251

(22) Filed: Nov. 18, 2016

(65) Prior Publication Data

US 2017/0146924 A1    May 25, 2017

(30) Foreign Application Priority Data

Nov. 24, 2015 (JP) .................. 2015-228744

(51) Int. Cl.
 G03G 15/043 (2006.01)
 H04N 1/00 (2006.01)

(52) U.S. Cl.
 CPC ............ *G03G 15/043* (2013.01); *H04N 1/00* (2013.01)

(58) Field of Classification Search
 CPC ................ G03G 15/043; H04N 1/00
 See application file for complete search history.

(56) References Cited

U.S. PATENT DOCUMENTS

| | | | |
|---|---|---|---|
| 9,715,189 B2 * | 7/2017 | Horiuchi | G03G 15/043 |
| 2017/0019560 A1 * | 1/2017 | Horiuchi | H04N 1/4052 |
| 2017/0019561 A1 * | 1/2017 | Furuta | H04N 1/4052 |
| 2017/0019562 A1 * | 1/2017 | Furuta | H04N 1/4052 |
| 2017/0019564 A1 * | 1/2017 | Horiuchi | H04N 1/4052 |
| 2017/0041489 A1 * | 2/2017 | Furuta | G03G 15/04072 |
| 2017/0280001 A1 * | 9/2017 | Furuta | H04N 1/2346 |

FOREIGN PATENT DOCUMENTS

JP    2012-098622 A    5/2012

* cited by examiner

*Primary Examiner* — Rodney Bonnette
(74) *Attorney, Agent, or Firm* — Canon USA, Inc., IP Division

(57) ABSTRACT

An image forming apparatus includes a laser light source configured to emit a light beam, a photoconductor drum configured to be driven for rotation on which a latent image is formed by the light beam, a rotatable polygonal mirror configured to rotate about a rotation axis and have a plurality of mirror planes which deflect the light beam so that the light beam scans the photoconductor drum, and a CPU configured to perform a dither process on input image data and correct image data which has been subjected to the dither process using correction amounts based on inclinations of the plurality of mirror planes relative to the rotation axis of the rotatable polygonal mirror.

16 Claims, 18 Drawing Sheets

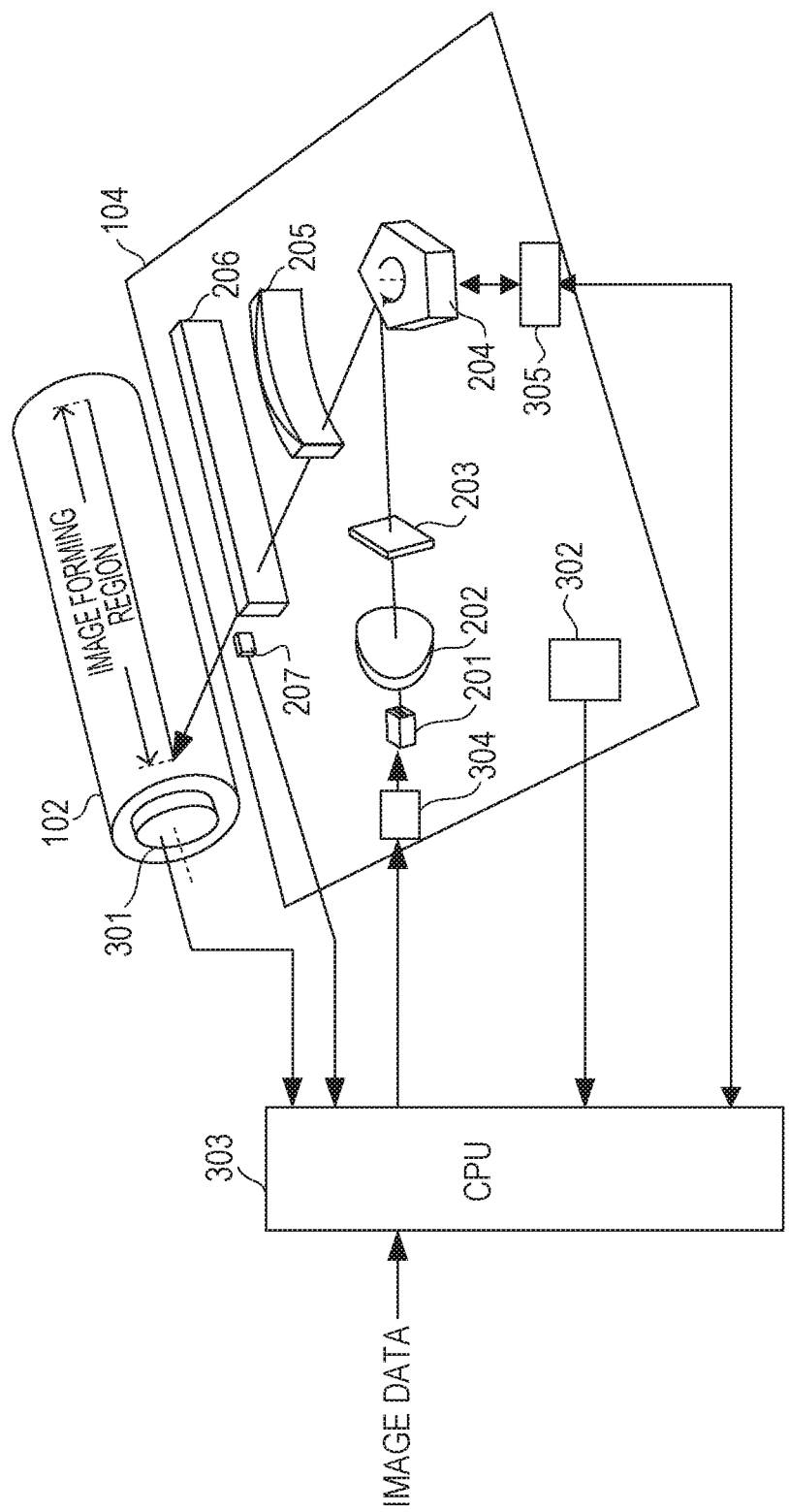

IMAGE FORMING APPARATUS

BACKGROUND OF THE INVENTION

Field of the Invention

The aspect of the embodiments relates to image forming apparatuses which correct distortion and density unevenness of a 2D image at a time of image formation, such as digital copiers, multifunction devices, and laser printers.

Description of the Related Art

As an electrophotographic method of an image forming apparatus, such as a laser printer or a copier, a method for forming a latent image on a photoreceptor using an optical scanning device which performs scanning using laser light is generally employed. In such an optical scanning device employing a laser scanning method, laser light formed in parallel light using a collimator lens is deflected by a rotatable polygonal mirror and an image is formed on the photoreceptor using the deflected laser light through a long fθ lens. Furthermore, such an optical scanning device employs a multi-beam scanning method for performing scanning simultaneously using a plurality of laser beams emitted from a multi-beam light source having a plurality of light emitting elements in one package.

On the other hand, to form an excellent image which does not include density unevenness or banding, in one embodiment, scanning lines of laser light are arranged at regular pitches on the photoreceptor. However, the pitches between the scanning lines may vary due to a plurality of reasons below. For example, the pitches between the scanning lines vary due to variation of a surface speed of the photoreceptor, variation of a rotation speed of the rotatable polygonal mirror, or the like. Furthermore, the pitches between the scanning lines also vary due to variation of an angle of a mirror surface of the rotatable polygonal mirror relative to a rotation axis of the rotatable polygonal mirror or variation of pitches between light emitting points arranged on a laser chip in a case of the multi-beam light source. In FIG. 16A, scanning with laser light is denoted by horizontal lines and a state in which pitches between the scanning lines periodically vary is illustrated. As illustrated in FIG. 16A, development is performed with high density in a case where a pitch between the scanning lines of the laser light is small whereas development is performed with low density in a case where a pitch between the scanning lines of the laser light is large, and accordingly, a stripe pattern (moire) is likely to be detected. To address such density unevenness and banding caused by the reasons described above, a technique of correcting banding by controlling an exposure amount of the optical scanning device has been proposed. For example, Japanese Patent Laid-Open No. 2012-098622 discloses a configuration in which a beam position detection unit for a sub scanning direction is disposed in the vicinity of a photoreceptor and an exposure amount of an optical scanning device is controlled based on scanning pitch information obtained from detected beam positions so that banding becomes unnoticeable.

Furthermore, an image forming apparatus performs a halftone process on image data using a dither pattern so that a halftone (intermediate gradation) is expressed. A line screen or a dot screen, for example, is used for an image which is subjected to the halftone process.

However, some screens used in the halftone process are affected by tilt of the mirror surface of the rotatable polygonal mirror (hereinafter simply referred to as "plane tilt" of a rotatable polygonal mirror) and others are not. FIGS. 16B and 16C are diagrams illustrating a phenomenon of the plane tilt of the rotatable polygonal mirror. In FIGS. 16B and 16C, gray portions denote dither patterns. Furthermore, light gray portions (white portions) denote portions in which a pitch between scanning lines of laser light emitted from a light source is sparse, and dark gray portions (black portions) denote portions in which a pitch between scanning lines is dense. In an image using a line screen illustrated in FIG. 16B, a stripe pattern of the line screen regularly extends across portions where dense/sparse portions of the scanning lines are generated, and therefore, moire is emphasized. On the other hand, in an image using a dot screen illustrated in FIG. 16C, when compared with the case of the line screen, portions where dots and sparse/dense portions overlap with each other are irregularly generated, shades of gray are less generated when compared with the case of the line screen, and a degree of moire is lower when compared with the case of the line screen.

Furthermore, in a case where an exposure amount is controlled when the density unevenness caused by dense/sparse portions of the scanning lines is corrected, since density per a predetermined area is not stored before and after the correction, the correction may not appropriately function depending on an input image pattern, and accordingly, correction performance may be degraded. Here, FIGS. 17C and 17D are diagrams illustrating correction performed by extracting a portion of an image pattern (the line screen) of FIG. 16A using a general method for performing density adjustment using an exposure amount as disclosed in Japanese Patent Laid-Open No. 2012-098622. Specifically, FIG. 17C is a diagram illustrating an image pattern before the correction, and FIG. 17D is a diagram illustrating an image pattern after the correction. Furthermore, "A1" and "A2" of FIGS. 17C and 17D indicate correction target ranges, and "B1" and "B2" of FIG. 17D including the correction target ranges A1 and A2, respectively, indicate ranges which have been subjected to the correction. In FIG. 17D, image density is corrected in the correction target ranges A1 and A2 when compared with FIG. 17C. However, in the ranges B1 and B2 including surrounding portions of the correction target ranges A1 and A2, portions of high image density and portions of low image density are generated, that is, excessive correction occurs, since the method does not store density before and after the correction, and accordingly, correction may fail depending on a pattern of an input image.

To address this situation in the general method, an exposure method for correcting dense/sparse portions by shifting a center of density over a plurality of pixels as illustrated in FIGS. 18A to 18C is considered. However, use of the method for shifting a center of density may not obtain a correction effect if the shifted density may not be accurately reproduced in accordance with a gradation characteristic. Furthermore, environmental variation, such as aging, variation in temperature, or variation in humidity, considerably affects the gradation characteristic of electrophotography. Therefore, appropriate correction is applied when the gradation characteristic varies due to the environmental variation.

SUMMARY OF THE INVENTION

The aspect of the embodiments provides an image forming apparatus including a light source configured to emit a light beam, a photoreceptor configured to be driven for rotation on which a latent image is formed by the light beam, a rotatable polygonal mirror configured to rotate about a rotation axis and have a plurality of mirror planes which deflect the light beam so that the light beam scans the photoreceptor, a processing unit configured to perform a dither process on input image data, and a correction unit configured to correct image data which has been subjected to the dither process using correction amounts based on inclinations of the plurality of mirror planes relative to the rotation axis of the rotatable polygonal mirror. The light source emits the light beam for forming the latent image based on the corrected image data. The correction unit determines the correction amounts in accordance with a type of the dither process.

Further features of the disclosure will become apparent from the following description of exemplary embodiments with reference to the attached drawings.

BRIEF DESCRIPTION OF THE DRAWINGS

FIG. 1B is a diagram illustrating a configuration of periphery of a photoconductor drum and an optical scanning device according to the first and second embodiments.

FIGS. 10A to 10D are diagrams illustrating the coordinate conversion of pixel positions in a sub scanning direction according to the first embodiment.

DESCRIPTION OF THE EMBODIMENTS

Hereinafter, exemplary embodiments of the disclosure will be described in detail with reference to the accompanying drawings. It is assumed that a rotation axis direction of a photoconductor drum which is a direction in which scanning is performed with laser light is referred to as a "main scanning direction" which is a second direction, and a rotation direction of the photoconductor drum which is a direction substantially orthogonal to the main scanning direction is referred to as a "sub scanning direction", which is a first direction. Specifically, the first direction corresponds to the rotation direction of the photoconductor drum and the second direction corresponds to the direction of scanning with a light beam on the photoconductor drum. First, FIGS. 16B, 16C, 17, and 18 described above will be further described in detail.

Influence of Plane Tilt to Dithers

Figure 16A:
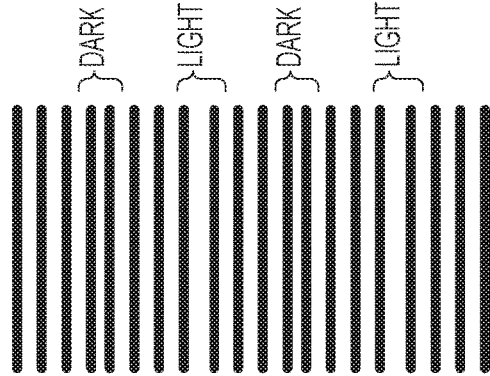
FIG. 16A is a diagram illustrating density unevenness in the related art.
Figure 16B:
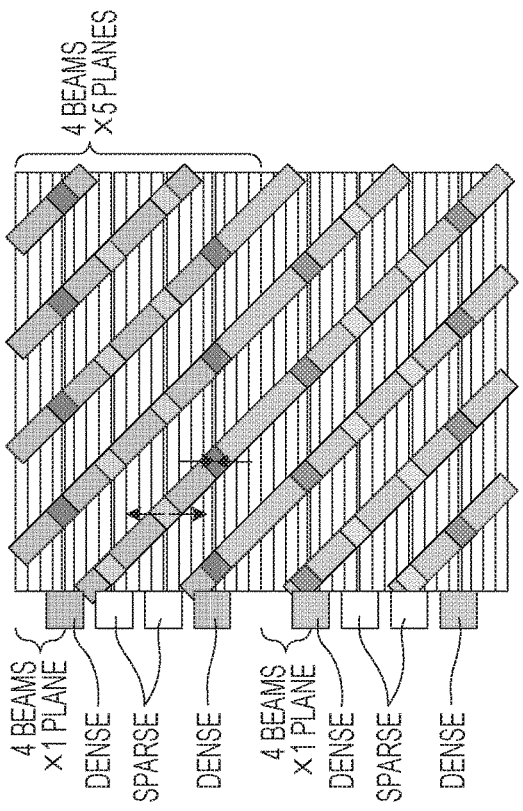
FIGS. 16B and 16C are diagrams illustrating influence on dithers due to plane tilt according to the related art.
Figure 16C:
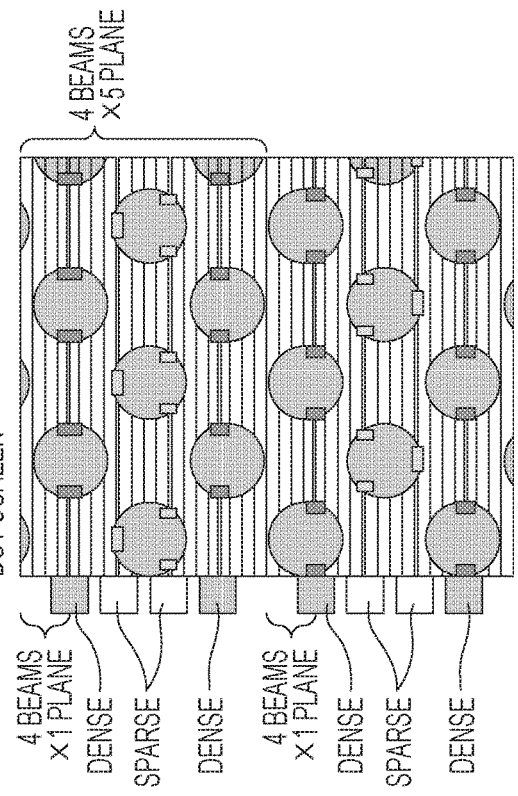

FIGS. 16B and 16C are diagrams illustrating a phenomenon of plane tilt of a rotatable polygonal mirror. It is assumed here that the rotatable polygonal mirror has five mirror planes and a light source has four light emitting elements. Laser light emitted from the light source is deflected by a mirror plane of the rotatable polygonal mirror and scanning lines are formed on a scanning target. The scanning lines formed by four laser beams deflected by the mirror plane of the rotatable polygonal mirror are represented by horizontal rectangular shapes in FIGS. 16B and 16C. A longitudinal direction of the rectangles indicating the scanning lines corresponds to the main scanning direction and a direction orthogonal to the main scanning direction corresponds to the sub scanning direction. The photoconductor drum is exposed with the laser light of 20 lines (=4 beams×5 planes) every rotation of the rotatable polygonal mirror. Therefore, a dense/sparse portion is generated in a boundary between a scanning line of a fourth beam in a certain scanning operation and a scanning line of a first beam in a next scanning operation, and a such dense/sparse portion is repeated in a period of 20 lines. In FIGS. 16B and 16C, gray portions denote patterns of dithers. Furthermore, light gray portions (white portions) denote portions where pitches between the scanning lines are sparse and dark gray portions (black portions) denote portions where pitches between the scanning lines are dense.

FIG. 16B is a diagram illustrating an image in which a halftone is represented using a line screen tilted by 45 degrees relative to the sub scanning direction, and a stripe pattern of the line screen regularly extends across the dense/sparse portions of the scanning lines, and therefore, moire is emphasized. On the other hand, FIG. 16C is a diagram illustrating an image in which a halftone is represented using a dot screen tilted by 45 degrees relative to the sub scanning direction. In the dot screen, when compared with the case of the line screen, portions in which dots and the dense/sparse portions overlap with each other are irregularly generated, shades of gray are less generated when compared with the case of the line screen, and a degree of moire is lower when compared with the case of the line screen.

Relationship Between Correction Amount and Moire Degree

Figure 17A:
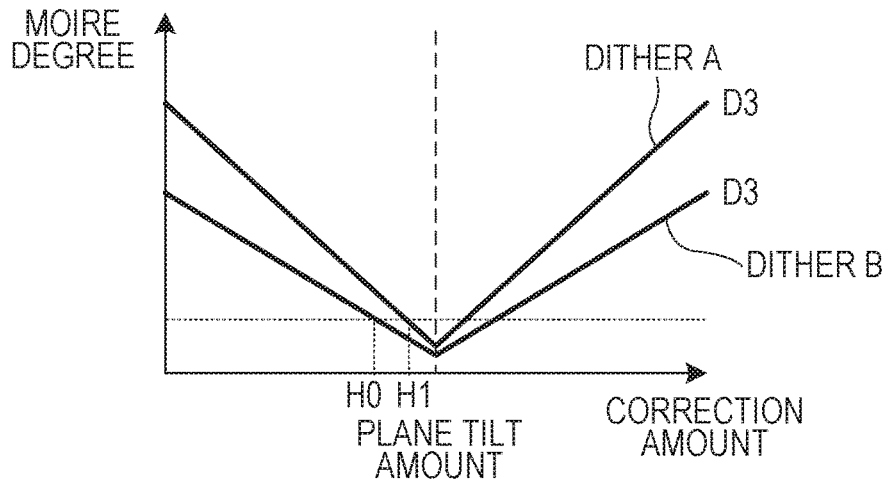
FIGS. 17A and 17B are diagrams illustrating the relationship between a plane tilt correction amount and a correction residual error according to the related art.

A degree of moire generated due to the plane tilt varies depending on a used dither. FIG. 17A is a graph illustrating the relationships between a plane tilt correction amount and a moire degree in two dithers A and B in a case where image density is fixed (D3 in FIG. 17A). An axis of abscissae denotes the plane tilt correction amount and an axis of ordinates denotes the moire degree of the plane tilt. As illustrated in FIG. 17A, the moire degree becomes the smallest when the plane tilt correction amount is equal to a plane tilt amount, and therefore, a moire degree obtained when the correction amount is equal to the plane tilt amount is in the smallest point in the graph (characteristic curves) indicating the relationship between the plane tilt correction amount and the moire degree. Furthermore, a moire degree at the smallest point varies depending on a dither, and in FIG. 17A, a moire degree of the dither B is smaller than a moire degree of the dither A. In this graph (the characteristic curves), as the correction amount becomes far from the plane tilt amount (that is, as the correction amount becomes larger than the plane tilt amount or becomes smaller than the plane tilt amount), the moire degree becomes larger. This state is represented by a curve having a characteristic of a V shape. Furthermore, in FIGS. 17A and 17B, a dotted line indicates a visibility limit of the moire, and H0 and H1 denote plane tilt correction amounts corresponding to the visibility limit when the dithers B and A are used, respectively, and have the following relationship: H0<H1. If the same plane tilt correction amount is applied to different dithers, different moire degrees are obtained for the different dithers. Therefore, to obtain the same moire degree, the plane tilt correction amounts are to be corrected for the dithers to be used.

Figure 17B:
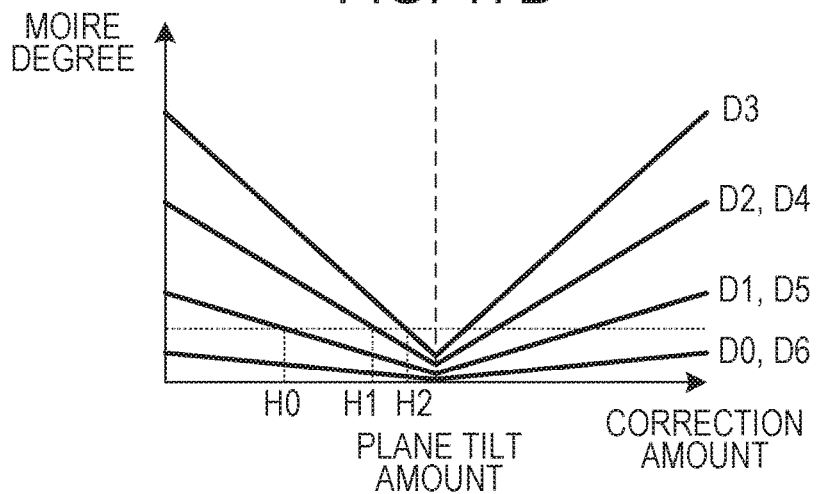

Furthermore, even when the same dither is used, if image densities are different, different moire degrees are obtained. FIG. 17B is a graph (characteristic curves) illustrating the relationships between plane tilt correction amounts and moire degrees for individual image densities when the same dither is used. An axis of abscissae denotes the plane tilt correction amount, an axis of ordinate denotes the moire degree of the plane tilt, and a dotted line denotes a visibility limit of the moire in FIG. 17B. In FIG. 17B, D0 to D6 denote image densities, and the image densities are increased in order from D0 to D6. As illustrated in FIG. 17B, as the image density is low, the moire degree is low. However, as the image density is high, the moire degree is low since shading waves crush. As a result, the relationships between the plane tilt correction amount and the moire degree in the case of the image densities D0 and D6 are denoted by the same characteristic curve. Similarly, the relationships between the plane tilt correction amount and the moire degree in the case of the image densities D1 and D5 are denoted by the same characteristic curve, and the relationships between the plane tilt correction amount and the moire degree in the case of the image densities D2 and D4 are denoted by the same characteristic curve. Furthermore, H0, H1, and H2 in FIG. 17B denote plane tilt correction amounts for the visibility limit in the case of the image densities D1 and D5, the image densities D2 and D4, and the image density D3, respectively, and the plane tilt correction amounts H0, H1, and H2 have the following relationship: H0<H1<H2. Note that in a case of the image densities D0 and D6, the moire degree is smaller than the visibility limit irrespective of the plane tilt correction amount, and therefore, moire is not visually recognized. Even in a case where the same dither is used, if the same correction amount is applied to different image densities, different moire degrees are obtained for different image densities. Therefore, to obtain the same moire degree, the plane tilt correction amounts are to be corrected for the different image densities.

Correction in General Methods

Figure 17C:
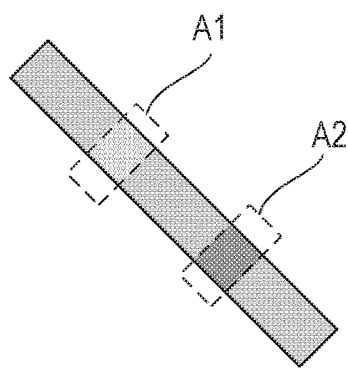
FIGS. 17C and 17D are diagrams illustrating plane tilt correction according to the related art.
Figure 17D:
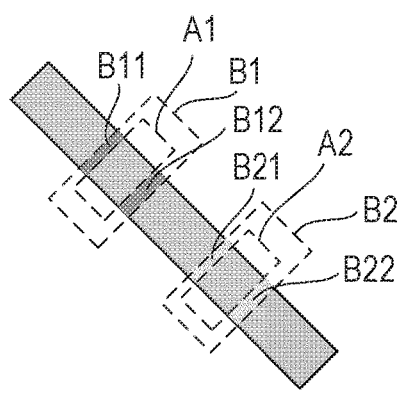

In general, an amount of a light beam at an end in the sub scanning direction of a certain scanning operation (for example, a fourth light beam) is corrected based on a far distance or a close distance between the fourth light beam and a light beam adjacent to the fourth light beam (for example, a first light beam in a next scanning operation). A density per a predetermined area is not stored before and after the correction, and therefore, the correction may not be appropriately performed depending on an input image pattern. FIG. 17C is a diagram illustrating a portion of the image pattern (the line screen) of FIG. 16B. In FIG. 17C, plane tilt occurs in the rotatable polygonal mirror, and therefore, a region A1 in which scanning lines adjacent to each other in the rotatable polygonal mirror is sparse is generated resulting in low density. Similarly, plane tilt occurs in the rotatable polygonal mirror, and therefore, a region A2 in which scanning lines adjacent to each other is dense is generated resulting in high density. In this way, if the plane tilt of the rotatable polygonal mirror is generated, density unevenness is generated as a whole. FIG. 17D is a diagram illustrating a result of correction performed by the general method on the plane tilt of the rotatable polygonal mirror of FIG. 17C. Also in regions B11 and B12 which are adjacent to the region A1 and regions B21 and B22 which are adjacent to the region A2 in FIG. 17D, a pitch between laser beams is the same as that of the original beams. Therefore, the regions B11 and B12 which are positioned in opposite sides of the region A1 which is a sparse portion in FIG. 17C have, as a result of the correction, high density as illustrated in FIG. 17D. On the other hand, the regions B21 and B22 which are positioned in opposite sides of the region A2 which is a dense portion in FIG. 17C have, as a result of the correction, low density as illustrated in FIG. 17D. As described above, according to FIG. 17D, the density unevenness is generated due to the correction of the plane tilt of the rotatable polygonal mirror, that is, appropriate correction may not be performed.

Other Correction Methods

Figure 18A:
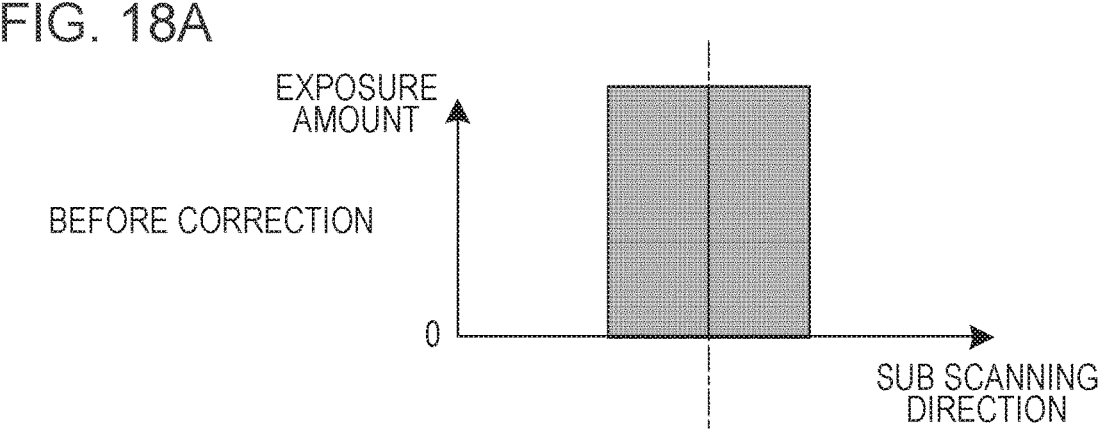
FIGS. 18A to 18C are diagrams illustrating the plane tilt correction using a shift of a center of an exposure amount according to the related art.
Figure 18B:
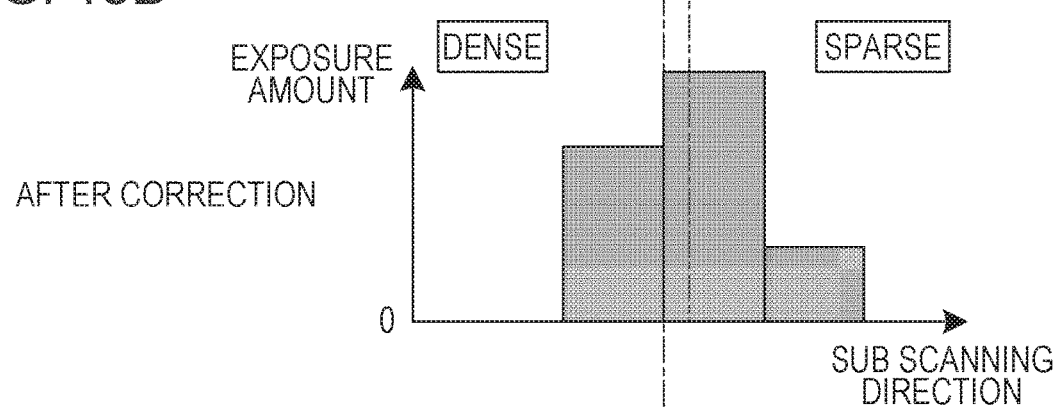
Figure 18C:
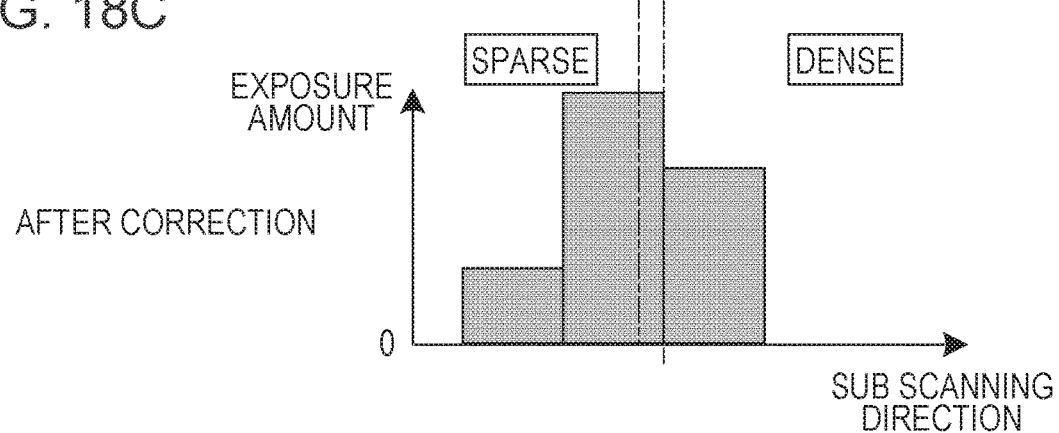

As a correction method performed irrespective of an input image pattern, an exposure method illustrated in FIGS. 18A to 18C in which a center position of an image is shifted by combining peripheral scanning lines may be considered. In FIGS. 18A to 18C, axes of abscissae denote a position in the sub scanning direction, axes of ordinates denote an exposure amount, and bars in bar graphs denote exposure amounts in sub scanning positions. FIG. 18A is a graph illustrating an exposure amount in a sub scanning position exposed based on input data. FIGS. 18B and 18C are graphs illustrating exposure amounts in sub scanning positions in a case where a process of shifting a center from a sparse portion to a dense portion of the scanning lines is performed when compared with FIG. 18A. In FIGS. 18B and 18C, as a result of a calculation for shifting a center position after image density before and after the process of shifting the center is stored, a large number of halftone (intermediate gradation) pixels are generated. Therefore, large environmental variation, such as variation in temperature or variation in humidity, affects correction performance due to an electrophotographic characteristic. Specifically, in a case where an optimum correction effect is obtained when a center of input image data is shifted in a certain direction and development is performed with a certain gradation, a gradation characteristic is changed due to the environmental variation, for example, and accordingly, a linear characteristic may be obtained or a characteristic of steeply rising at a certain exposure amount may be obtained. In this case, if the development is performed with the linear gradation characteristic, excessive correction is performed, or if development is performed in a gradation characteristic of steeply rising at a certain exposure amount, conversely, correction may not be sufficient.

First Embodiment

Configuration of Entire Image Forming Apparatus

Figure 1A:
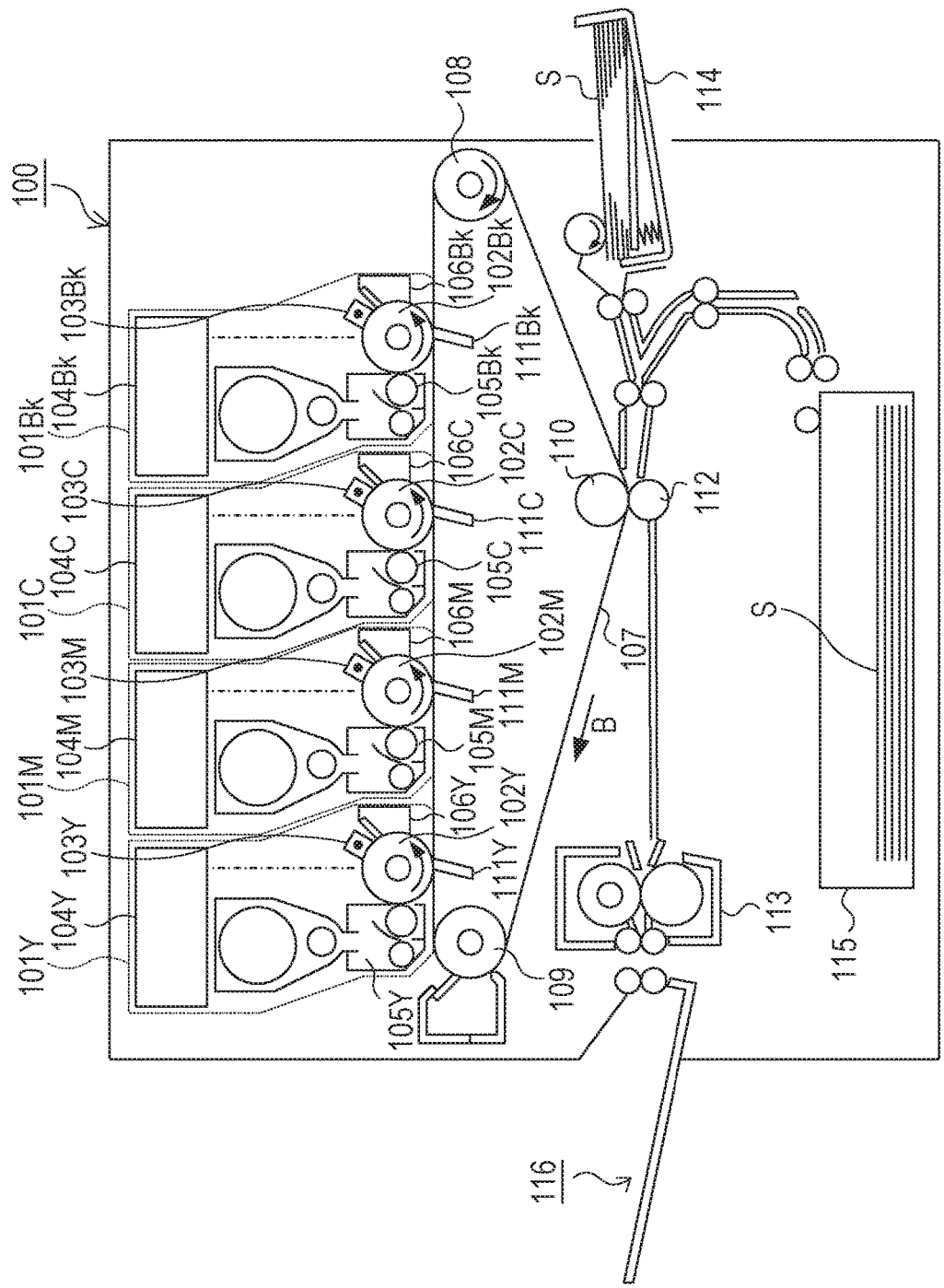
FIG. 1A is a diagram illustrating an entire image forming apparatus according to first and second embodiments.

FIG. 1A is a cross sectional view schematically illustrating a digital full color printer (a color image forming apparatus) which performs image formation using a plurality of color toners. An image forming apparatus 100 according to this embodiment will be described with reference to FIG. 1A. The image forming apparatus 100 includes four image forming sections (image forming units) 101Y, 101M, 101C, and 101Bk (denoted by dotted lines) which form images of different colors. The image forming sections 101Y, 101M, 101C, and 101Bk perform image formation using toners of yellow, magenta, cyan, and black, respectively. Here, "Y", "M", "C", and "Bk" represent yellow, magenta, cyan, and black, respectively, and the indices Y, M, C, and Bk are omitted hereinafter except for a case where a specific color is described.

The image forming section 101 includes a photoconductor drum 102 serving as a photoreceptor. A charging device 103, an optical scanning device 104, and a development device 105 serving as a development unit are disposed near the photoconductor drum 102. Furthermore, a cleaning device 106 is disposed near the photoconductor drum 102. An intermediate transfer belt 107 as an endless belt is disposed below the photoconductor drum 102. The intermediate transfer belt 107 is stretched by a driving roller 108 and driven rollers 109 and 110 and conveyed in a direction indicated by an arrow mark B of FIG. 1A (a clockwise direction) during the image formation.

Furthermore, a primary transfer device 111 is disposed in a position opposite to the photoconductor drum 102 through the intermediate transfer belt 107 (an intermediate transfer member). Furthermore, the image forming apparatus 100 of this embodiment further includes a secondary transfer device 112 which transfers the toner images on the intermediate transfer belt 107 on a sheet S serving as a recording medium and a fixing device 113 which fixes the toner images on the sheet S.

An image forming process including a charging process to a developing process of the image forming apparatus 100 will now be described. Image forming processes performed by the individual image forming sections 101 are the same, and therefore, the image forming process performed by the image forming section 101Y is described as an example and descriptions of the image forming processes performed by the image forming sections 101M, 101C, and 101Bk are omitted. The charging device 103Y of the image forming section 101Y charges the photoconductor drum 102Y which is driven for rotation in a direction indicated by an arrow mark in FIG. 1A (an anticlockwise direction). The charged photoconductor drum 102Y is exposed by laser light denoted by a chain line emitted from the optical scanning device 104Y. By this, an electrostatic latent image is formed on the rotating photoconductor drum 102Y (the photoreceptor). The electrostatic latent image formed on the photoconductor drum 102Y is developed as a yellow toner image by the development device 105Y. The same process is performed by the image forming sections 101M, 101C, and 101Bk.

The image forming process after the transfer process will be described. The primary transfer devices 111 to which a transfer voltage is applied transfer the toner images of yellow, magenta, cyan, and black formed on the photoconductor drums 102 of the image forming sections 101 to the intermediate transfer belt 107. By this, the toner images of the individual colors overlap with one another on the intermediate transfer belt 107. That is, the toner images of the four colors are transferred to the intermediate transfer belt 107 (first transfer). The toner images of the four colors transferred to the intermediate transfer belt 107 are further transferred by the secondary transfer device 112 to the sheet S conveyed to a secondary transfer section from a manual feed sheet cassette 114 or a sheet cassette 115 (secondary transfer). The unfixed toner images on the sheet S are fixed by heat by the fixing device 113 so that a full-color image is obtained on the sheet S. The sheet S having the image formed thereon is discharged to a sheet discharging unit 116.

Photoconductor Drum and Optical Scanning Device

FIG. 1B is a diagram illustrating configurations of the photoconductor drum 102, the optical scanning device 104, and a controller of the optical scanning device 104. The optical scanning device 104 includes a multi-beam laser light source (hereinafter referred to as a "laser light source") 201, a collimator lens 202, a cylindrical lens 203, and a rotatable polygonal mirror 204. The laser light source 201 is the multi-beam laser light source which generates laser light (light beams) by a plurality of light emitting elements. The collimator lens 202 forms laser light into parallel light. The cylindrical lens 203 collects the laser light which passes through the collimator lens 202 in the sub scanning direction. Note that, although the multi-beam light source which emits a plurality of beams is described as an example of the laser light source 201 in this embodiment, the same operation is performed in a case where a single light source is used. The laser light source 201 is driven by a multi-beam laser driving circuit (hereinafter simply referred to as a "laser driving circuit") 304. The rotatable polygonal mirror 204 includes a motor unit which performs rotation movement and a reflection mirror attached to a motor shaft. Hereinafter, planes of the reflection mirror of the rotatable polygonal mirror 204 are referred to as "mirror planes". The rotatable polygonal mirror 204 is driven by a rotatable polygonal mirror driving unit 305. The optical scanning device 104 includes fθ lenses 205 and 206 on which laser light (scanning light) deflected by the rotatable polygonal mirror 204 is incident. The optical scanning device 104 further includes a memory 302 which stores various types of information.

Furthermore, the optical scanning device 104 includes a beam detector 207 (hereinafter referred to as a "BD 207") serving as a signal generation unit which detects the laser light deflected by the rotatable polygonal mirror 204 and which outputs a horizontal synchronization signal (hereinafter referred to as a "BD signal") in response to the detection of the laser light. The laser light emitted from the optical scanning device 104 is used to scan the photoconductor drum 102. The optical scanning device 104 and the photoconductor drum 102 are positioned such that scanning is performed with laser light in parallel to a rotation axis of the photoconductor drum 102. The optical scanning device 104 shifts a spot of a light beam of the multi-beam laser in the main scanning direction (scanning) every time the mirror plane of the rotatable polygonal mirror 204 scans the photoconductor drum 102 once. In this way, scanning lines corresponding to a number of laser elements (light emitting elements) are simultaneously generated. In this embodiment, the rotatable polygonal mirror 204 has five planes and the laser light source 201 includes eight laser elements, for example. In this embodiment, image formation for eight lines is performed by one mirror plane of the rotatable polygonal mirror 204, that is, one scanning operation with laser light. The rotatable polygonal mirror 204 performs image formation for 40 lines by performing five scanning operations with laser light per one rotation.

The photoconductor drum 102 includes a rotary encoder 301, and the rotary encoder 301 detects a rotation speed of the photoconductor drum 102. The rotary encoder 301 generates 1000 pulses during one rotation of the photoconductor drum 102. The rotary encoder 301 includes a measurement unit, not illustrated, which measures time intervals of pluses on an internal substrate thereof. The rotary encoder 301 outputs information on the rotation speed (rotation speed data) of the photoconductor drum 102 to a CPU 303 based on the time intervals of the pulses measured by the measurement unit. Note that general speed detection techniques other than the rotary encoder may be used as long as the rotation speed of the photoconductor drum 102 may be detected. Examples of such a method other than the encoder include a method for detecting a surface speed of the photoconductor drum 102 by laser Doppler or the like.

Figure 2:
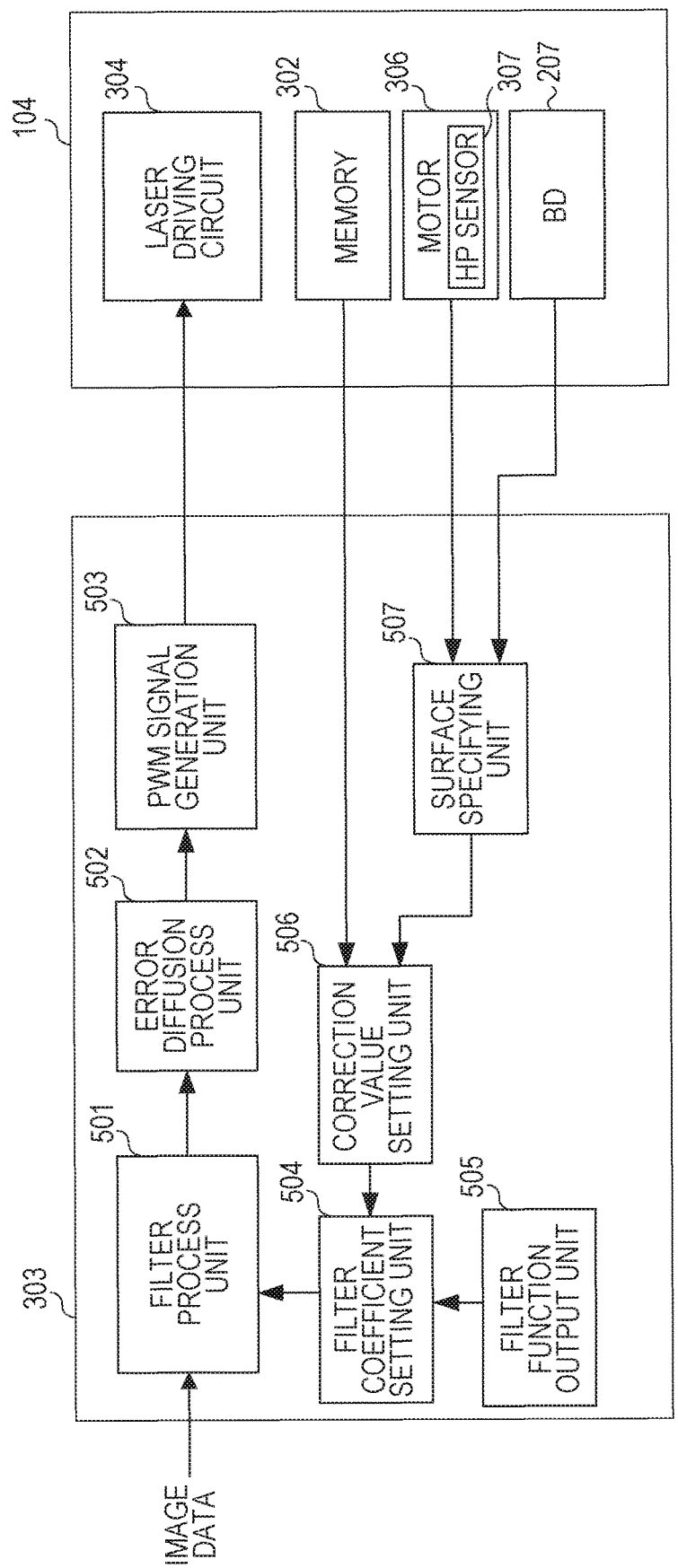
FIG. 2 is a block diagram illustrating the image forming apparatus according to the first and second embodiments.

Next, the CPU 303 serving as a controller will be described with reference to FIG. 2. FIG. 2 is a block diagram illustrating functions as a correction unit, a conversion unit, and a filter process unit of the CPU 303 which executes a correction process of correcting distortion and density unevenness of an image described below. The CPU 303 includes a filter process unit 501, an error diffusion process unit 502, and a PWM signal generation unit 503. The filter process unit 501 performs the filter process by performing a convolution calculation on input image data. The error diffusion process unit 502 performs an error diffusion process on image data which has been subjected to the filter process. The PWM signal generation unit 503 performs PWM conversion on image data which has been subjected to the error diffusion process so as to output a PWM signal to the laser driving circuit 304 of the optical scanning device 104.

Furthermore, the CPU 303 includes a filter coefficient setting unit 504, a filter function output unit 505, and a correction value setting unit 506. The filter function output unit 505 outputs data on a function to be used in the convolution calculation (data on a table, for example) to the filter coefficient setting unit 504, and examples of the function to be used in the convolution calculation include an linear interpolation and bicubic interpolation. The correction value setting unit 506 calculates an amount of a position shift of a scanning line based on information on a position shift amount read from the memory 302 and a plane synchronization signal supplied from a plane specifying unit 507. The correction value setting unit 506 calculates a correction value based on the position shift amount of a scanning line and outputs the calculated correction value to the filter coefficient setting unit 504. The filter coefficient setting unit 504 calculates a filter coefficient based on the information on the convolution function supplied from the filter function output unit 505 and the correction value of the scanning line supplied from the correction value setting unit 506. The filter coefficient is used in the filter process performed by the filter process unit 501. The filter coefficient setting unit 504 sets the calculated filter coefficient to the filter process unit 501.

The CPU 303 further includes the plane specifying unit 507. The plane specifying unit 507 specifies one of the mirror planes of the rotatable polygonal mirror 204 based on an HP signal supplied from a home position sensor (HP sensor) 307 of the optical scanning device 104 and a BD signal supplied from the BD 207. The plane specifying unit 507 outputs information on the specified mirror plane as a plane synchronization signal to the correction value setting unit 506.

As illustrated in FIG. 1B, image data is supplied to the CPU 303 from an image controller, not illustrated, which generates the image data. Furthermore, the CPU 303 is connected to the rotary encoder 301, the BD 207, the memory 302, and the rotatable polygonal mirror driving unit (hereinafter referred to as a "mirror driving unit") 305. The CPU 303 detects a position of start of writing of the scanning line based on the BD signal supplied from the BD 207 and counts a time interval between the BD signals so as to detect a rotation speed of the rotatable polygonal mirror 204. Furthermore, the CPU 303 outputs an acceleration/deceleration signal of an instruction for acceleration/deceleration to the mirror driving unit 305 so that the rotatable polygonal mirror 204 rotates in a predetermined speed. The mirror driving unit 305 supplies driving current to the motor unit of the rotatable polygonal mirror 204 in accordance with the acceleration/deceleration signal supplied from the CPU 303 so as to drive a motor 306.

As illustrated in FIG. 2, the rotatable polygonal mirror 204 includes the HP sensor 307 mounted thereon which outputs an HP signal to the CPU 303 when the rotatable polygonal mirror 204 has a predetermined angle during rotation operation. The plane specifying unit 507 of the CPU 303 specifies one of the five mirror planes of the rotatable polygonal mirror 204 which has been subjected to scanning with laser light, that is, a mirror plane which has been subjected to scanning, when detecting the HP signal supplied from the HP sensor 307. After specifying one of the mirror planes once, the plane specifying unit 507 continuously specifies one of the mirror planes based on the BD signal output from the BD 207. The BD 207 outputs one pulse of the BD signal every time an arbitrary mirror plane of the rotatable polygonal mirror 204 is scanned once with the laser light, and therefore, the CPU 303 may count the BD signals so as to continuously specify one of the mirror planes of the rotatable polygonal mirror 204.

The memory 302 stores information on positions of the mirror planes of the rotatable polygonal mirror 204 and information on a position of the multi-beam laser. The CPU 303 reads, from the memory 302, position shift information in the sub scanning direction caused by the plane tilt of the individual mirror planes of the rotatable polygonal mirror 204 and position shift information relative to ideal positions of the multi-beam laser in resolution of 1200 dpi in the sub scanning direction. The CPU 303 calculates information on positions of the scanning lines based on the position shift information read from the memory 302.

The correction value setting unit 506 calculates correction values based on the positional information of the scanning lines supplied from the memory 302 and outputs the calculated correction values to the filter coefficient setting unit 504. The filter coefficient setting unit 504 calculates a filter coefficient using the correction values input from the correction value setting unit 506 and the filter function input from the filter function output unit 505. The filter process unit 501 receives image data from an image controller, not illustrated, which generates image data. The filter process unit 501 performs the filter process on the image data based on the filter coefficient supplied from the filter coefficient setting unit 504 so as to calculate image data obtained taking information on correction of the positions of the scanning lines into consideration. The CPU 303 outputs a light emitting amount data to the laser driving circuit 304 based on the image data obtained taking the information on the correction of the positions of the scanning lines into consideration. Note that, in this embodiment, the laser driving circuit 304 performs light amount control by controlling a lighting time of individual pixels by pulse width modulation (PWM) control based on the light emitting amount data supplied from the CPU 303. Note that the PWM control may not be performed when the light amount control is performed, and the light amount control may be performed by amplitude modulation (AM) control for controlling peak light amounts of the individual pixels.

Figure 3:
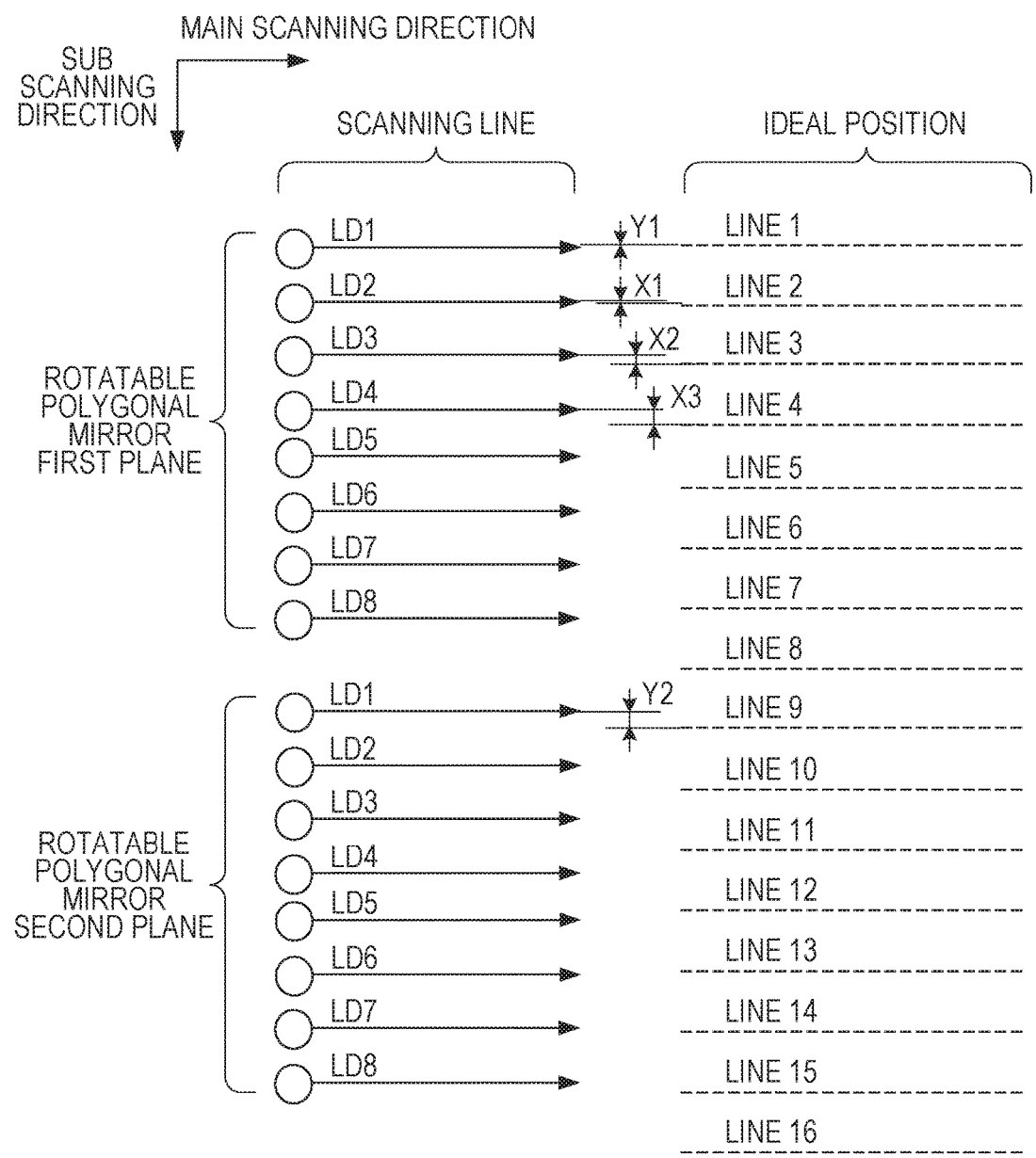
FIG. 3 is a diagram illustrating position shifts of scanning lines according to the first and second embodiments.

Next, the scanning position information stored in the memory 302 will be described with reference to FIG. 3 and Table 1. FIG. 3 is a diagram illustrating position shifts from ideal positions of the individual scanning lines. Scanning lines of scanning with laser beams of the multi-beam laser having eight light emitting points are denoted by "LD1" to "LD8". An ideal pitch (a predetermined pitch) between the scanning lines is determined based on resolution. In a case of an image forming apparatus forming an image of a resolution of 1200 dpi, an ideal pitch between the scanning lines is 21.16 µm. In a case where the scanning line LD1 is set as a reference position, ideal distances D2 to D8 from the scanning line LD1 to the individual scanning lines LD2 to LD8 are calculated in accordance with Expression (1).

$$Dn=(n-1)\times 21.16 \text{ µm } (n=2 \text{ to } 8) \quad \text{Expression (1)}$$

For example, the ideal distance D4 from the scanning line LD1 to the scanning line LD4 is 63.48 µm (=(4−1)×21.16 µm).

Here, the pitch among the scanning lines has an error due to an error of an element pitch of the multi-beam laser and variation of lens magnification. It is assumed that position shift amounts of the scanning line positions of the scanning lines LD2 to LD8 relative to ideal positions determined in accordance with the ideal distances D2 to D8 are denoted by "X1" to "X7". It is assumed that, in a first plane of the rotatable polygonal mirror 204, for example, the position shift amount X1 of the scanning line LD2 corresponds to a difference between the ideal position of the scanning line LD2 (hereinafter referred to as a "line 2" and the same is true on the other scanning lines) and an actual scanning line. Furthermore, it is assumed that the position shift amount X3 of the scanning line LD4 corresponds to a difference between a line 4 and an actual scanning line.

The rotatable polygonal mirror 204 has variation in every mirror plane since angles of mirror planes relative to the rotation axis of the rotatable polygonal mirror 204 is not completely parallel to one another due to variation of the mirror planes in fabrication. Position shift amounts relative to ideal positions of the mirror planes of the rotatable polygonal mirror 204 are represented by Y1 to Y5 in a case where the number of planes of the rotatable polygonal mirror 204 is 5. In FIG. 3, an amount of shift from an ideal position of a scanning line LD1 in the first plane is denoted by "Y1", and an amount of shift from an ideal position of a scanning line LD1 in a second plane is denoted by "Y2".

It is assumed that a mirror plane of the rotatable polygonal mirror 204 is denoted by an "m-th plane", and a position shift amount of a scanning line (LDn) of n-th laser light of the multi-beam is denoted by "Zmn". In this case, the position shift amounts Zmn are represented by Expression (2) using position shift amounts X1 to X7 of the individual scanning lines and the position shift amounts Y1 to Y5 of the individual mirror planes.

$$Zmn=Ym+X(n-1) \quad (m=1 \text{ to } 5 \text{ and } n=1 \text{ to } 8) \quad \text{Expression (2)}$$

(Note that X(0)=0.)

For example, a position shift amount Z14 of the scanning line LD4 of the first plane of the rotatable polygonal mirror 204 is obtained as follows in accordance with Expression (2): Z14=Y1+X3. Furthermore, a position shift amount Z21 of the scanning line LD1 of the second plane of the rotatable polygonal mirror 204 is obtained as follows in accordance with Expression (2): Z21=Y2.

In a case where a position shift amount Zmn is calculated by a calculation of Expression (2), a number of data corresponding to the number of mirror planes of the rotatable polygonal mirror 204 and the number of elements of the multi-beam laser are used for the calculation of the position shift amount Zmn. Here, an address map of position shift data stored in the memory 302 is illustrated.

TABLE 1

| ADDRESS | DATA |
|---|---|
| 0 | LD2 POSITIONAL INFORMATION X1 |
| 1 | LD3 POSITIONAL INFORMATION X2 |
| 2 | LD4 POSITIONAL INFORMATION X3 |
| 3 | LD5 POSITIONAL INFORMATION X4 |
| 4 | LD6 POSITIONAL INFORMATION X5 |
| 5 | LD7 POSITIONAL INFORMATION X6 |
| 6 | LD8 POSITIONAL INFORMATION X7 |
| 7 | FIRST PLANE POSITIONAL INFORMATION Y1 |
| 8 | SECOND PLANE POSITIONAL INFORMATION Y2 |
| 9 | THIRD PLANE POSITIONAL INFORMATION Y3 |
| 10 | FOURTH PLANE POSITIONAL INFORMATION Y4 |
| 11 | FIFTH PLANE POSITIONAL INFORMATION Y5 |

As illustrated in Table 1, information on the position shift amount (positional information) X1 to information on the positional information X7 from the scanning line LD2 to the scanning line LD8 are stored in addresses 0 to 6 in the memory 302. Furthermore, information on the position shift amount Y1 to information on the position shift amount Y5 of the first to fifth mirror planes of the rotatable polygonal mirror 204 are stored in addresses 7 to 11 in the memory 302.

Note that, in this embodiment, the eight scanning lines of the laser beams are uniformly shifted by the position shifts of the mirror planes of the rotatable polygonal mirror 204. However, in a case where the position shift amounts of the individual scanning lines of the laser light vary depending on a mirror plane of the rotatable polygonal mirror 204, a number of information on position shift amounts corresponding to a number of combinations of the mirror planes of the rotatable polygonal mirror 204 and the scanning lines of the laser light may be stored. Specifically, in this case, the number of mirror planes of the rotatable polygonal mirror 204 is 5 and the number of elements of the laser light source 201 is 8, and accordingly, 40 positional information items are stored in the memory 302.

Memory Storage Operation

The information on the position shift amounts stored in the memory 302 corresponds to data measured in a process of adjusting the optical scanning device 104 in a factory, or the like. Furthermore, the image forming apparatus 100 may include a unit for detecting a position of a scanning line of scanning with laser light emitted from the laser light source 201 and update the information stored in the memory 302 in real time. As a unit for detecting a position of the scanning light in the sub scanning direction, a general technique may be used. For example, a method for detecting a position using a complementary metal-oxide semiconductor (CMOS) sensor or a position sensitive detector (PSD) disposed inside the optical scanning device 104 or in the vicinity of the photoconductor drum 102 may be employed. Furthermore, a method for disposing a triangle slit on a photodiode (PD) plane inside the optical scanning device 104 or in the vicinity of the photoconductor drum 102 and detecting a position from an output pulse width of a PD may be employed.

Figure 4:
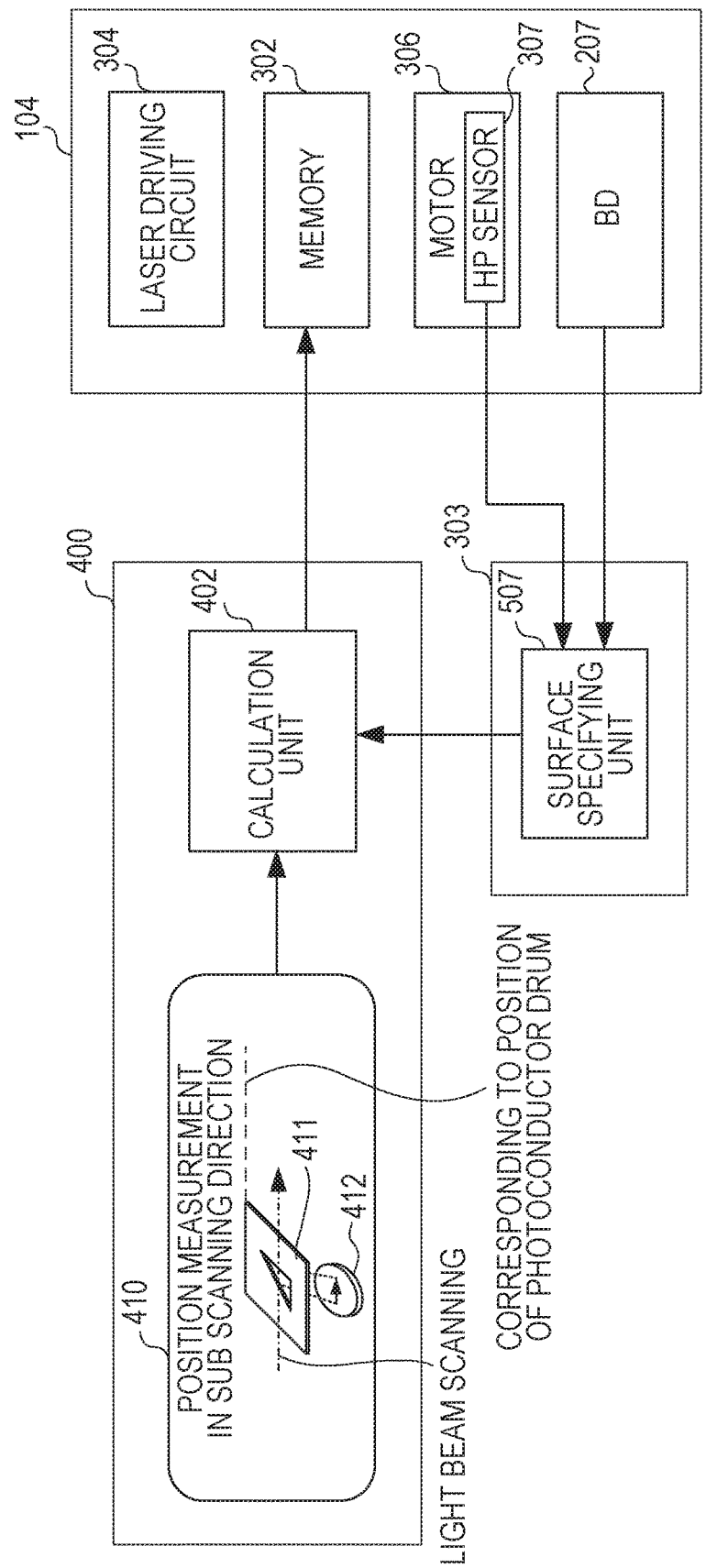
FIG. 4 is a block diagram illustrating a process of storing information in a memory according to the first and second embodiments.

FIG. 4 is a block diagram illustrating a state in which the information is stored in the memory 302 of the optical scanning device 104 in a factory or the like. Note that components the same as those in FIG. 2 are denoted by reference numerals the same as those in FIG. 2, and descriptions thereof are omitted. In the process of adjusting the optical scanning device 104, a measurement tool 400 is disposed in a position corresponding to a position of the photoconductor drum 102 when the optical scanning device 104 is mounted on the image forming apparatus 100. The measurement tool 400 includes a measurement unit 410 and a calculation unit 402 which receives a plane synchronization signal from the plane specifying unit 507 of the CPU 303 of FIG. 2. Note that only the plane specifying unit 507 is illustrated in the CPU 303 of FIG. 4. First, the optical scanning device 104 emits laser light to the measurement unit 410. The measurement unit 410 includes a triangle slit 411 and a PD 412. In FIG. 4, a light beam which is emitted from the optical scanning device 104 for scanning and which is denoted by an arrow mark of a chain line scans the triangle slit 411. The measurement unit 410 measures positions of scanning lines in the sub scanning direction based on information on the light beams input to the PD 412 through the triangle slit 411. The measurement unit 410 outputs information on the measured positions of the scanning lines in the sub scanning direction for each mirror plane of the rotatable polygonal mirror 204 (hereinafter referred to as "each-plane data") to the calculation unit 402.

On the other hand, an HP signal and a BD signal are input to the plane specifying unit 507 from the HP sensor 307 and the BD 207 of the optical scanning device 104, respectively. By this, the plane specifying unit 507 specifies a mirror plane of the rotatable polygonal mirror 204 and outputs information on the specified mirror plane as a plane synchronization signal to the calculation unit 402. The calculation unit 402 writes information on the positions of the scanning lines in the sub scanning direction measured by the measurement unit 410 in the addresses in the memory 302 of the optical scanning device 104 corresponding to the information on the mirror plane of the rotatable polygonal mirror 204 input from the plane specifying unit 507. In this way, the information on the position shift amounts (X1 to X7) of the scanning lines generated due to variation of the eight elements of the laser light source 201 and information on the position shift amounts (Y1 to Y5) of the scanning lines caused due to the plane tilt of the mirror planes of the rotatable polygonal mirror 204 are stored in the memory 302.

Page Process

When receiving a print job from an operation unit or an external apparatus, not illustrated, the CPU 303 performs an initial operation of resetting a timer, a counter, and the like, not illustrated, used in the following processing as a preparation for the page process in a series of processes of electrophotography. Thereafter, when the preparation for the page process is terminated and it is determined that the page process is available, the CPU 303 executes a control sequence illustrated in a flowchart of FIG. 5.

Figure 5:
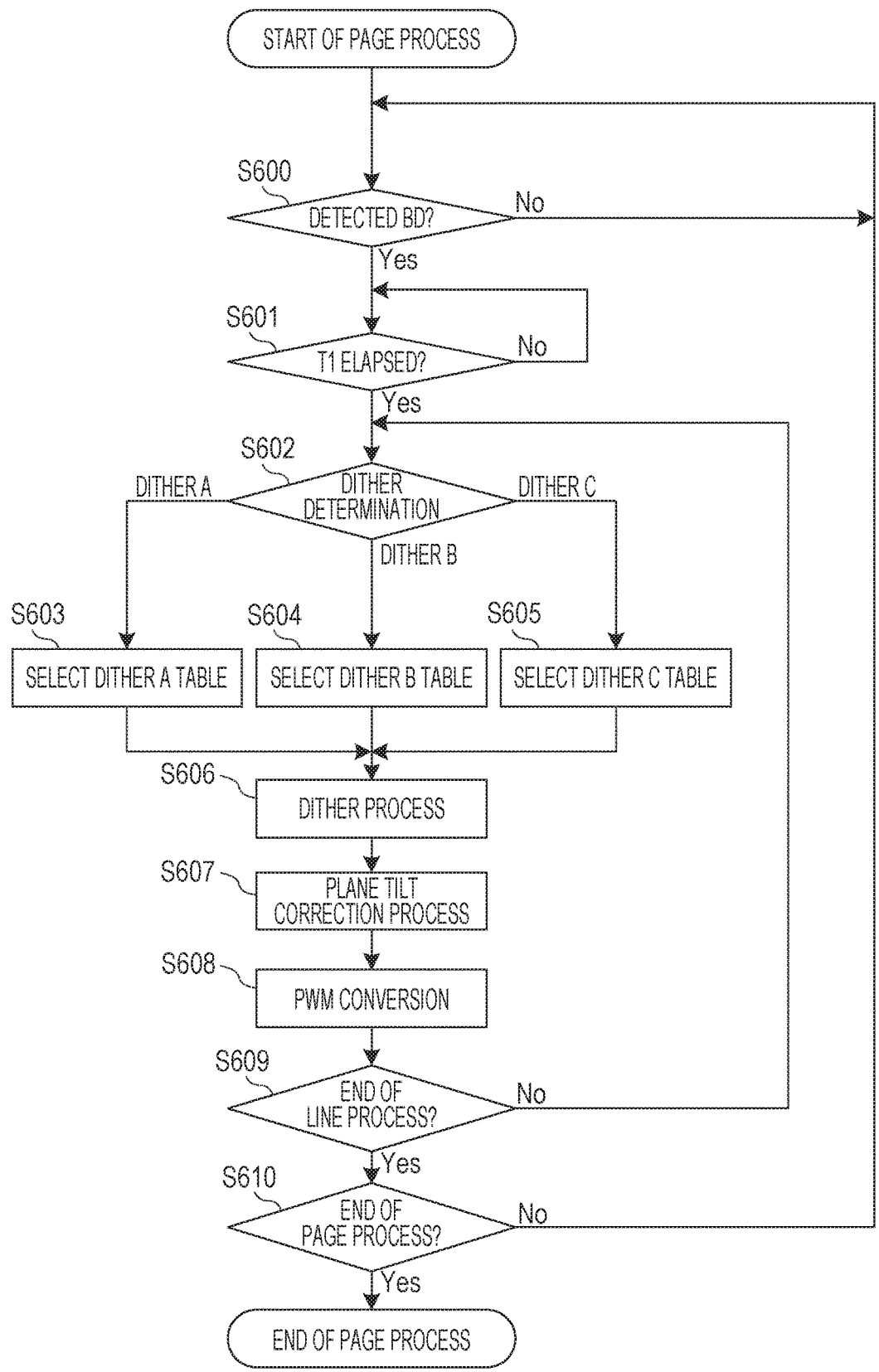
FIG. 5 is a flowchart illustrating a page process according to the first embodiment.

In step S600 of FIG. 5, the CPU 303 determines whether a BD signal supplied from the BD 207 has been detected. When it is determined that the BD signal has been detected, the CPU 303 starts the timer for determining a period of time after the detection of the BD signal and the process proceeds to step S601, whereas when it is determined that the BD signal has not been detected, the process returns to step S600. In step S601, the CPU 303 determines whether a period of time T1 has elapsed with reference to the timer. Here, the period of time T1 is started when the BD signal is output and ended when the laser light reaches a leading end of an image region of the photoconductor drum 102 in the main scanning direction. In step S601, when determining that the period of time T1 has not elapsed, the CPU 303 returns to step S601, and otherwise, the CPU 303 proceeds to step S602.

In step S602, the CPU 303 detects a feature of an image and determines a dither method so as to select an optimum dither for each region including a plurality of pixels. An image of a first page includes various types of image, such as characters and photographs, and the characters and the photographs have different image features, for example. The image feature is extracted using a general method. For example, in a case where the image forming apparatus 100 is used as a printer, an image feature is extracted in accordance with a command transmitted from a PC, and in a case where the image forming apparatus 100 is used as a copier, an image feature is extracted in accordance with a result of the filter process performed on an image read by an image reading apparatus.

In this embodiment, a dither (that is, a screen) which is optimum for each region including a plurality of pixels is selected. However, an optimum dither may be selected for each page or each pixel, for example. In this embodiment, one of the dither A using the line screen, the dither B using the dot screen, and the dither C using the error diffusion is selected.

When determining that the dither A is to be selected in step S602, the CPU 303 selects a correction table for the dither A (the line screen) in step S603, and the process proceeds to step S606. When determining that the dither B is to be selected in step S602, the CPU 303 selects a correction table for the dither B (the dot screen) in step S604, and the process proceeds to step S606. When determining that the dither C is to be selected in step S602, the CPU 303 selects a correction table for the dither C (the error diffusion) in step S605, and the process proceeds to step S606. In this way, the CPU 303 selects a correction table suitable for the image feature. The correction table stores information on association between a plane tilt amount and a correction amount for the plane tilt amount.

In step S606, the CPU 303 performs gradation conversion on an input image by the dither process selected in step S603 to step S605. Note that it is assumed that the dither process performed in step S606 is a general technique, and therefore, a description thereof is omitted. In step S607, the CPU 303 reads a plane tilt amount (a position shift amount in the sub scanning direction), corrects the plane tilt amount corresponding to the dither in accordance with the correction table of the selected dither, and performs a plane tilt correction process based on the corrected plane tilt amount. In step S608, the CPU 303 performs conversion into a pulse width modulation (PWM) signal suitable for laser driving so as to perform image formation on a recording member by the electrophotographic process after the plane tilt correction process is terminated. In step S609, the CPU 303 determines whether a process for one line has been terminated. When the determination is negative, the process returns to step S602, and otherwise, the process proceeds to step S610. In step S610, the CPU 303 determines whether a process for all lines, that is, one page, has been terminated. When the determination is negative, the process returns to step S600, and otherwise, the page process is terminated.

Calculation of Plane Tilt Amount Corresponding to Dither

Before the plane tilt correction process executed in step S607 of FIG. 5 is described in detail, a calculation of a plane tilt amount corresponding to a dither which is a characteristic of this embodiment will be described below. In this embodiment, the CPU 303 reads a position shift amount (which is also referred to as a "plane tilt amount") in the sub scanning direction stored in the memory 302 in step S3602 of FIG. 7 described below and performs correction in accordance with the dither selected in step S603 to step S605. As described above, even in a case of the same plane tilt correction amount, if selected dithers are different, different moire degrees are obtained. Therefore, to obtain the same moire degree irrespective of the selected dither when the plane tilt correction process is performed, the plane tilt amount (the position shift amount) read from the memory 302 is to be corrected depending on the selected dither. In this embodiment, a proportional relationship (a rate) of the correction amount to the plane tilt amount in the selected dither is obtained, and the plane tilt amount read from the memory 302 is multiplied by the obtained rate, so that the plane tilt amount is corrected and the plane tilt correction process is performed based on the corrected plane tilt amount.

The CPU 303 calculates an amplitude amount ZW which is a fluctuation range of the position shift amount (the plane tilt amount) based on the position shift amount Zmn of the scanning line (LDn) of an n-th laser light of the multi-beam and the m-th mirror plane of the rotatable polygonal mirror 204 in accordance with Expression (3) below. Here, the amplitude range ZW indicates a difference between a largest value and a smallest value of the position shift amount Zmn (Expression (2)) of the scanning line obtained while the rotatable polygonal mirror 204 rotates once.

$$ZW=\text{(largest value of } Zmn\text{)}-\text{(smallest value of } Zmn\text{)}$$
$$(m=1 \text{ to } 5 \text{ and } n=1 \text{ to } 8) \qquad \text{Expression (3)}$$

Figure 6:
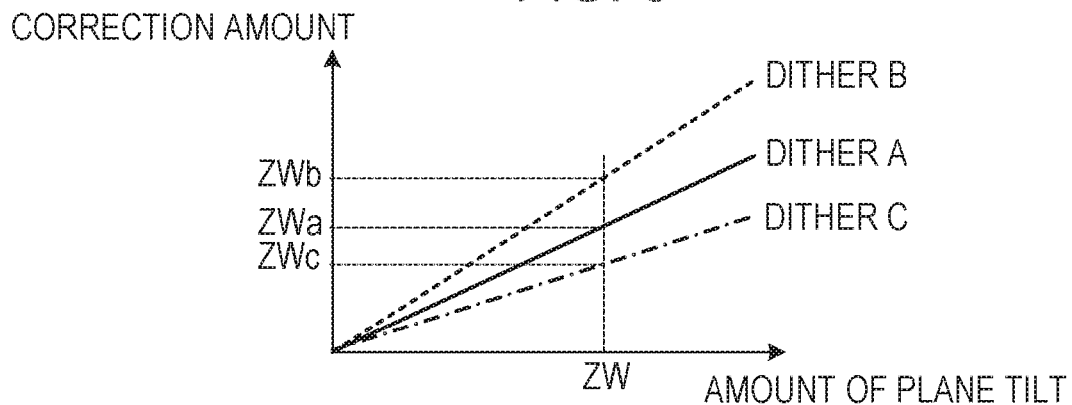
FIG. 6 is a plane tilt correction table according to the first embodiment.

FIG. 6 is a graph illustrating the relationship between the plane tilt amounts of the dithers and the correction amounts for the plane tilt amounts when one of the dithers is selected and used in step S603 to step 605 in FIG. 5 described above. An axis of abscissae denotes a plane tilt amount, and an axis of ordinates denotes a correction amount. In FIG. 6, a solid line, a dotted line, and a chain line denote the relationships between the plane tilt amounts and the correction amounts in cases of the dithers A, B, and C, respectively. As illustrated in FIG. 6, even in a case of the same plane tilt amount, different correction amounts are obtained for different used dithers. In FIG. 6, in a case where the amplitude amount ZW indicating a fluctuation range of a plane tilt amount described above is set as a plane tilt amount, correction amounts for the plane tilt amounts of the dithers A, B, and C are determined as ZWa, ZWb, and ZWc, respectively. In this embodiment, a position shift amount Zmn' after correction is calculated using a correction amount for a plane tilt amount in a case where an amplitude amount relative to the position shift amount Zmn is set as a plane tilt amount. Specifically, the position shift amount Zmn' after correction for the position shift amount Zmn (m=1 to 5 and n=1 to 8) read in step S3602 is calculated in accordance with Expressions (4), (5), and (6) for the dithers A, B, and C, respectively.

$$Zmn'=(ZWa/ZW) \times Zmn \qquad \text{Expression (4)}$$
$$Zmn'=(ZWb/ZW) \times Zmn \qquad \text{Expression (5)}$$
$$Zmn'=(ZWc/ZW) \times Zmn \qquad \text{Expression (6)}$$

Accordingly, a correction amount Cmn for the m-th mirror plane of the rotatable polygonal mirror 204 and the scanning line (LDn) of the n-th laser light of the multi-beam is determined in accordance with Expression (7) below in this embodiment.

$$Cmn=-Zmn' \qquad \text{Expression (7)}$$

Note that the CPU 303 includes a storage unit which stores tables which associate information on the plane tilt amounts with information on the correction amounts for the individual dithers A, B, and C. After selecting one of the dithers A, B, and C to be used in step S603 to step S605 in FIG. 5, the CPU 303 reads a correction amount corresponding to the amplitude amount of the plane tilt described above from the table corresponding to the selected dither. Then the CPU 303 calculates a position shift amount Zmn' after correction based on the position shift amount Zmn, the plane tilt amplitude amount, and the read correction amount so as to obtain a correction amount Cmn.

Plane Tilt Correction Process

Figure 7:
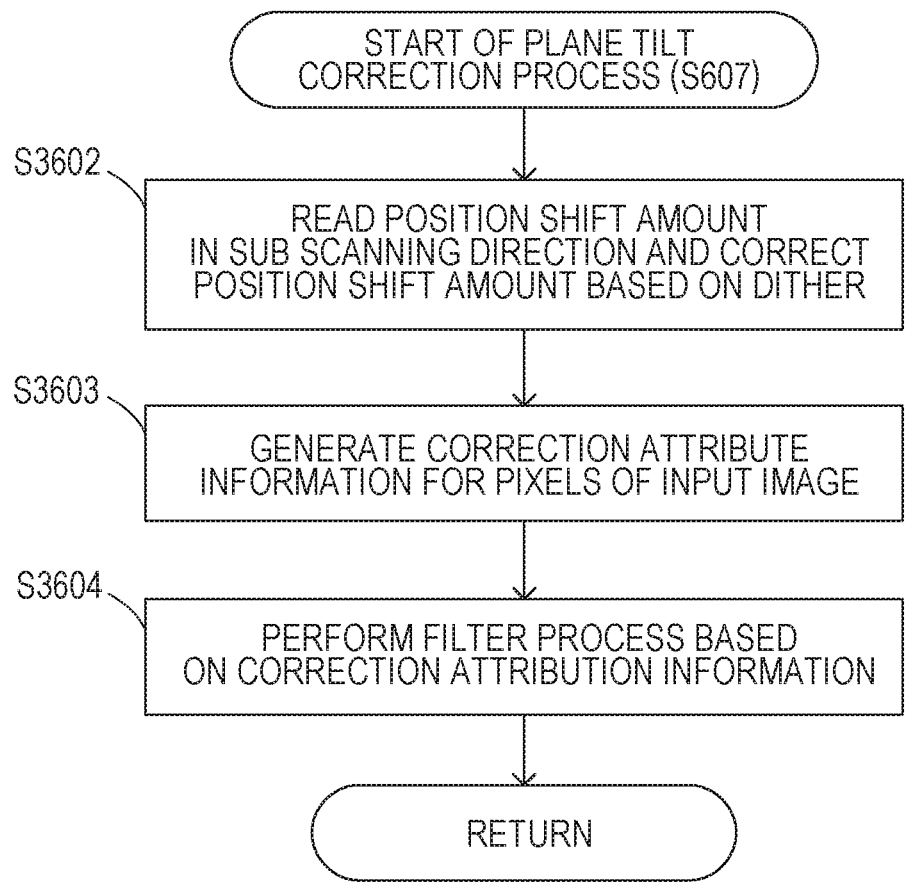
FIG. 7 is a flowchart illustrating plane tilt correction process according to the first embodiment.

Next, the plane tilt correction process executed in step S607 of FIG. 5 will be described in detail. In this embodiment, the CPU 303 performs correction on image data based on position shift amounts in the sub scanning direction of the scanning lines of the laser light, and outputs the corrected image data to the laser driving circuit 304. Hereinafter, a flowchart of FIG. 7 will be described. FIG. 7 is a flowchart of a correction process of correcting density unevenness and banding caused by position shifts in the sub scanning direction. In step S3602, the CPU 303 reads position shift amounts in the sub scanning direction stored in the memory 302. Specifically, the CPU 303 reads the positional information X1 to X7 of the scanning lines LD2 to LD8 described in Table 1 and the positional information Y1 to Y5 of the first to fifth planes of the rotatable polygonal mirror 204 from the memory 302. The CPU 303 adjusts the plane tilt positional information Y1 to Y5 of the rotatable polygonal mirror 204 based on the read correction amounts and phase amounts. In this embodiment, the position shift amounts in the sub scanning direction (X1 to X7 and Y1 to Y5 after the adjustment) are corrected in accordance with the dither selected as described above. After pixel positions in the sub scanning direction of the corrected image data are corrected, the filter process is performed so that image data, that is, density is output.

States of Positional Shifts of Scanning Lines

States of positional shifts of scanning lines may be classified into approximately four types. First, examples of the states of position shifts include (a) a case where a position of a scanning line on the photoconductor drum 102 (hereinafter referred to as a "scanning position") shifts in an forward direction relative to an ideal scanning position and (b) a case where a scanning position on the photoconductor drum 102 shifts in a backward direction relative to the ideal scanning position. Furthermore, the examples of the states of position shifts include (c) a case where pitches between scanning positions on the photoconductor drum 102 become smaller than an ideal pitch of the scanning positions and conversely (d) a case where the pitches between scanning positions on the photoconductor drum 102 become larger than the ideal pitch of the scanning positions. The examples of the states of positional shifts in the sub scanning direction are illustrated in FIGS. 8A to 8D. In FIGS. 8A to 8D, dotted lines denote scanning positions and "(1)" to "(5)" denote scanning order. Eight beams are simultaneously emitted in scanning in this embodiment, and numbers are assigned to the individual beams arranged in the sub scanning direction. Left columns of FIGS. 8A to 8D indicate ideal scanning positions, and right columns indicate scanning positions on the photoconductor drum 102. "S1" to "S5" denote position shift amounts from the ideal scanning positions corresponding to the scanning numbers (1) to (5). A unit of the position shift amounts is represented using an ideal beam pitch of 1 as a reference (21.16 µm for the resolution of 1200 dpi), and a forward direction of the light beams in the sub scanning direction (hereinafter simply referred to as a "forward direction") corresponds to a positive value. Furthermore, a backward direction of the light beams in the sub scanning direction (hereinafter simply referred to as a "backward direction") corresponds to a negative value. Furthermore, one pixel disposed in the sub scanning direction for description of a state of the image is denoted by a circle. Color of the circle indicates density.

Figure 8A:
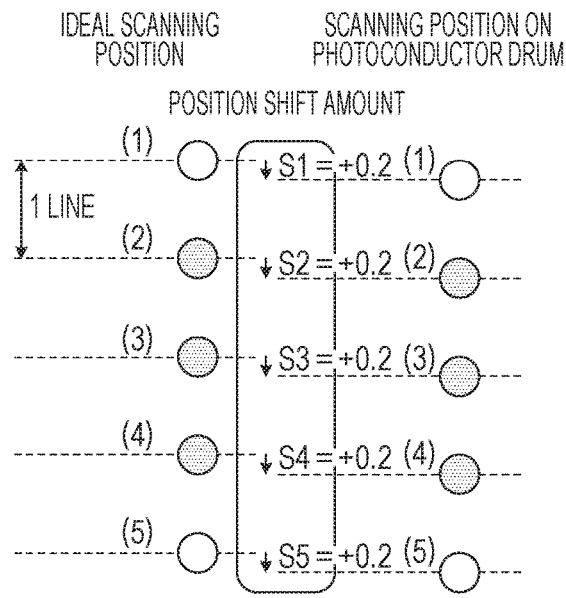
FIGS. 8A to 8D are diagrams illustrating position shifts of pixels for individual classifications according to the first embodiment.
Figure 8B:
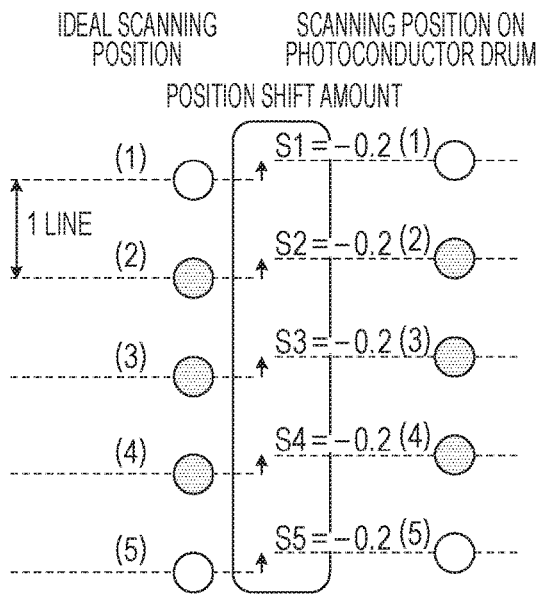

In FIG. 8A, the scanning positions on the photoconductor drum 102 uniformly shift from the ideal scanning positions by 0.2 in the forward direction. Hereinafter, the position shift amount illustrated in FIG. 8A is referred to as a shift amount of +0.2 lines. In FIG. 8B, the scanning positions on the photoconductor drum 102 uniformly shift from the ideal scanning positions by 0.2 in the backward direction. Hereinafter, the position shift amount illustrated in FIG. 8B is referred to as a shift amount of −0.2 lines. In FIGS. 8A and 8B, the scanning positions uniformly shift, and therefore, pitches between the scanning positions on the photoconductor drum 102 is 1.

Figure 8C:
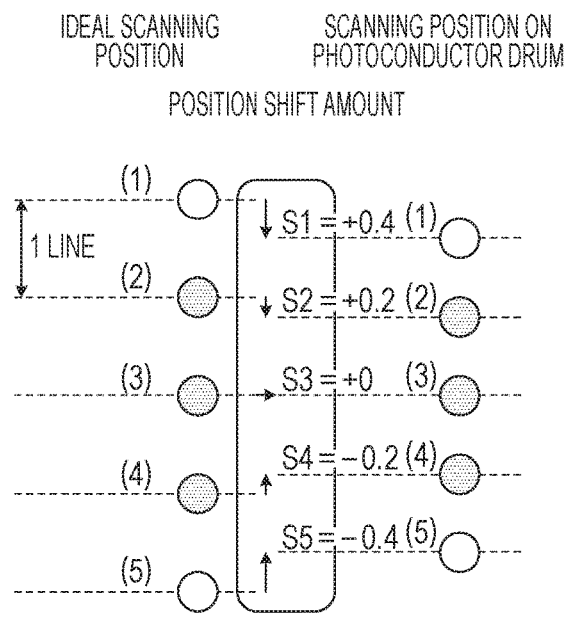

In FIG. 8C, a position shift amount of 0 is obtained in a certain scanning position on the photoconductor drum 102. However, as the scanning number of the scanning position becomes smaller relative to the scanning number of the scanning position having the position shift amount of 0, a position shift amount in the forward direction becomes larger, whereas as the scanning number of the scanning position become larger relative to the scanning number of the scanning position having the position shift amount of 0, a position shift amount in the backward direction becomes larger. For example, although the position shift amount S3 is +0 in the scanning number (3), the position shift amount S2 is +0.2 in the scanning number (2), the position shift amount S1 is +0.4 in the scanning number (1), the position shift amount S4 is −0.2 in the scanning number (4), and the position shift amount S5 is −0.4 in the scanning number (5). In FIG. 8C, pitches between the scanning positions is 0.8 which is smaller than 1. Hereinafter, the position shift state illustrated in FIG. 8C is referred to as a "dense state with a pitch of (1−0.2) lines.

Figure 8D:
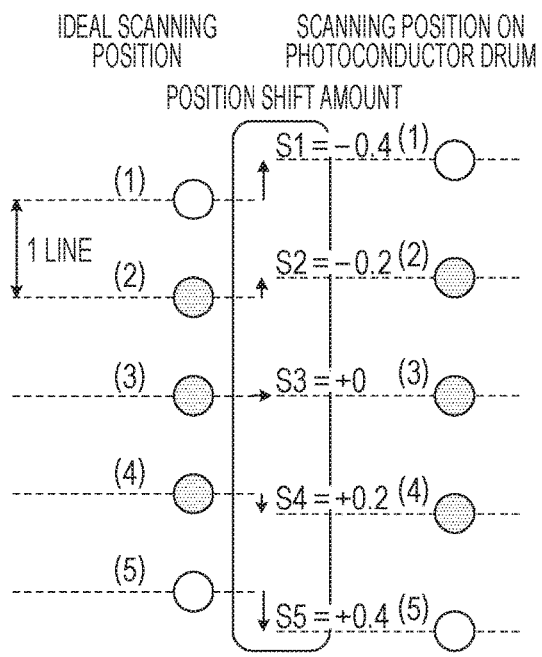

In FIG. 8D, a position shift amount of 0 is obtained in a certain scanning position on the photoconductor drum 102. However, as the scanning number of the scanning position becomes smaller relative to the scanning number of the scanning position having the position shift amount of 0, a position shift amount in the backward direction becomes larger, whereas as the scanning number of the scanning position becomes larger relative to the scanning number of the scanning position having the position shift amount of 0, a position shift amount in the forward direction becomes larger. For example, although the position shift amount S3 is +0 in the scanning number (3), the position shift amount S2 is −0.2 in the scanning number (2), the position shift amount S1 is −0.4 in the scanning number (1), the position shift amount S4 is +0.2 in the scanning number (4), and the position shift amount S5 is +0.4 in the scanning number (5). In FIG. 8D, pitches between the scanning positions is 1.2 which is larger than 1. Hereinafter, the position shift state illustrated in FIG. 8D is referred to as a "sparse state with a pitch of (1+0.2) lines.

In the dense state of FIG. 8C, in addition to generation of position shifts, high density is obtained since pixels gather on the photoconductor drum 102 due to the small pitches between the scanning positions and a pixel value per predetermined area is increased. In the sparse state of FIG. 8D, in addition to generation of position shifts, low density is obtained since pixels are separated from each other on the photoconductor drum 102 due to the large pitches between the scanning positions and a pixel value per predetermined area is reduced. In an electrophotographic process, a density difference may be further emphasized due to the relationship between a depth of a latent image potential and a development characteristic. Furthermore, if the dense state and the sparse state as illustrated in FIGS. 8C and 8D, respectively, are alternately generated, cyclic gradation is seen to be moire and even if the amount of moire is generated, the moire is visually detected with ease depending on a spatial frequency.

The description of the flowchart of FIG. 7 will be made again. In step S3603, the CPU 303 generates correction attribute information for the individual pixels of the input image using the correction value setting unit 506. In this embodiment, pixel positions in the sub scanning direction of the input image are subjected to coordinate conversion in advance before interpolation is performed, and accordingly, correction of local gradation may also be performed while density of the input image is stored, in addition to the correction of the position shifts. Here, the correction attribute information specifically corresponds to a correction value C described below.

Coordinate Conversion

A coordinate conversion method of this embodiment will be described with reference to FIGS. 9A and 9B, FIGS. 10A to 10D, and FIGS. 11A and 11B. In graphs in FIGS. 9A and 9B, FIGS. 10A to 10D, and FIGS. 11A and 11B, axes of abscissae denote a pixel number n, axes of ordinates denote a pixel position (or a scanning position) y (or y' after coordinate conversion), and a unit is a line. FIGS. 9A and 9B and FIGS. 11A and 11B correspond to FIGS. 8A to 8D, respectively. The graphs on a left side in FIGS. 9A, 9B, 11A, and 11B are obtained before coordinate conversion is performed and the graphs on a right side are obtained after coordinate conversion is performed on y axes. Rectangles plotted in the graphs denote the scanning positions on the photoconductor drum 102, and circles denote the ideal scanning positions.

Cases of Shifts in Forward Direction and Backward Direction

The graph on the left side in FIG. 9A will be described first. In the graph before the coordinate conversion, in the ideal scanning positions denoted by the circles, a pixel position y of 2 in the sub scanning direction corresponds to the pixel number 2, for example, that is, the ideal scanning positions form a straight line (denoted by a chain line) in which the pixel number n is equal to the pixel position y and an inclination is 1. The straight line of the chain line is represented by Expression (8) below.

$$y=n \qquad \text{Expression (8)}$$

The scanning positions denoted by the rectangles are shifted from the ideal scanning positions denoted by the circles by S (=0.2) lines in the forward direction (a positive direction in the y axis) as described with reference to FIG. 8A. Therefore, the scanning positions denoted by the rectangle forms a straight line (denoted by a solid line) represented by Expression (9) which has an inclination of 1 and which is offset.

$$y=n+S \qquad \text{Expression (9)}$$

The coordinate conversion is performed such that the actual scanning positions are converted into the ideal scanning positions in this embodiment, and accordingly, an expression below is used for the coordinate conversion in the case of FIG. 9A. Note that "C" in Expression (10) denotes a correction amount.

$$y'=y+C \qquad \text{Expression (10)}$$

Accordingly, the correction amount C is represented by Expression (11) below using a shift amount S.

$$C=-S \qquad \text{Expression (11)}$$

Note that the correction amount C and the shift amount S in Expression (11) correspond to the correction amount Cmn and the position shift amount Zmn' after the correction in the expression "Cmn=−Zmn'" in Expression (7) above.

Using Expression (10) for the coordinate conversion and Expression (11) for obtaining the correction amount C, Expressions (8) and (9) are converted into Expressions (12) and (13) below, respectively.

$$y'=y+C=n+(-S)=n-S \qquad \text{Expression (12)}$$

$$y'=y+C=(n+S)+C=(n+S)+(-S)=n \qquad \text{Expression (13)}$$

Figure 9A:
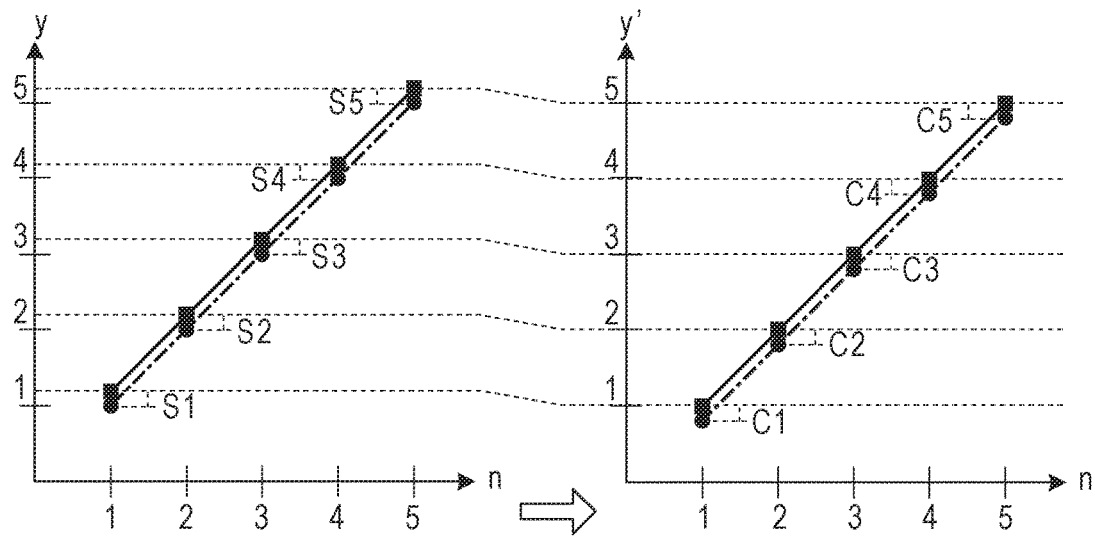
FIGS. 9A and 9B are diagrams illustrating coordinate conversion of pixel positions in a sub scanning direction according to the first embodiment.
Figure 9B:
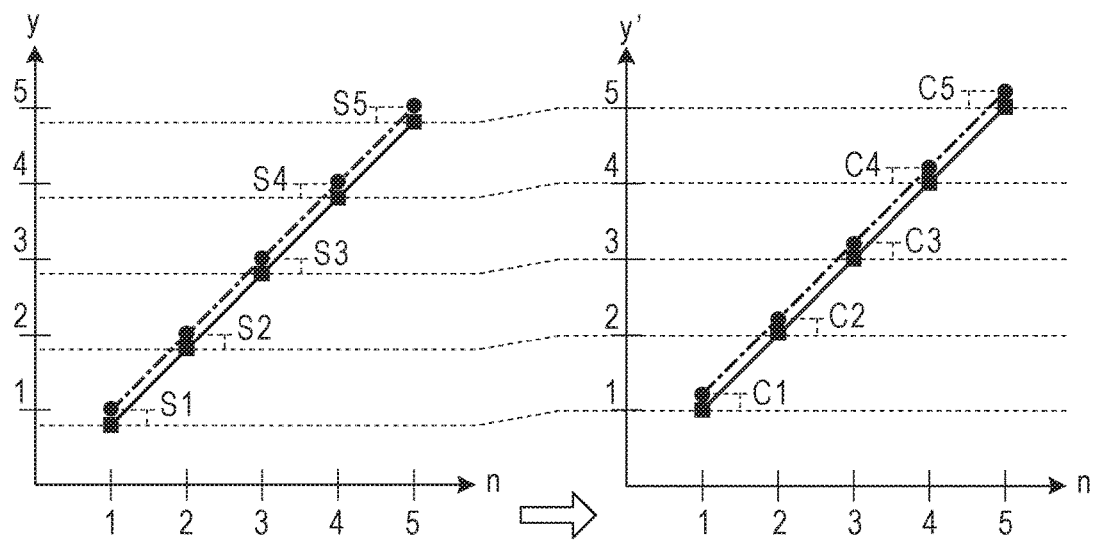

In FIG. 9B, assuming that a shift amount S is −0.2, Expressions (8) to (13) are similarly satisfied, and the description of FIG. 9A may also be applied to FIG. 9B. Note that, as illustrated in FIGS. 9A and 9B, in a case of scanning lines which do not have a dense/sparse portion in the scanning lines and which are shifted in the forward direction or the backward direction, the straight lines have a constant inclination before and after the conversion.

Cases where Dense/Sparse Portion is Generated

Figures 10A, 10B:
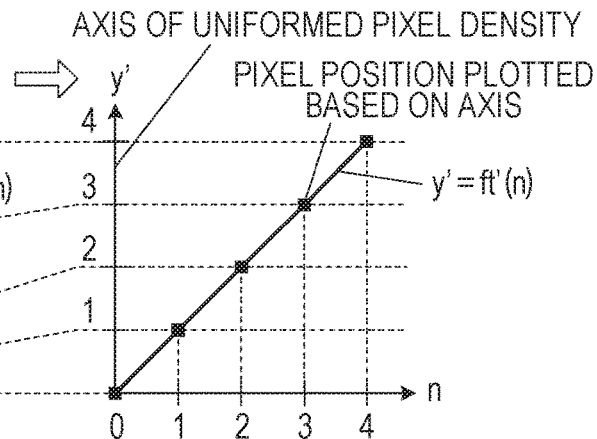
Figure 11A:
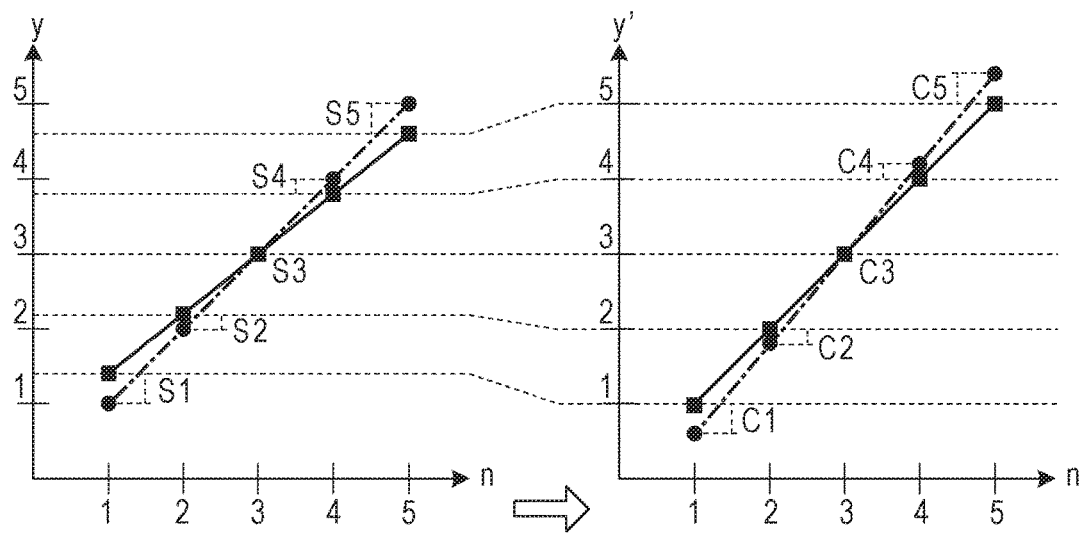
FIGS. 11A and 11B are diagrams illustrating the coordinate conversion of pixel positions in a sub scanning direction according to the first embodiment.
Figure 11B:
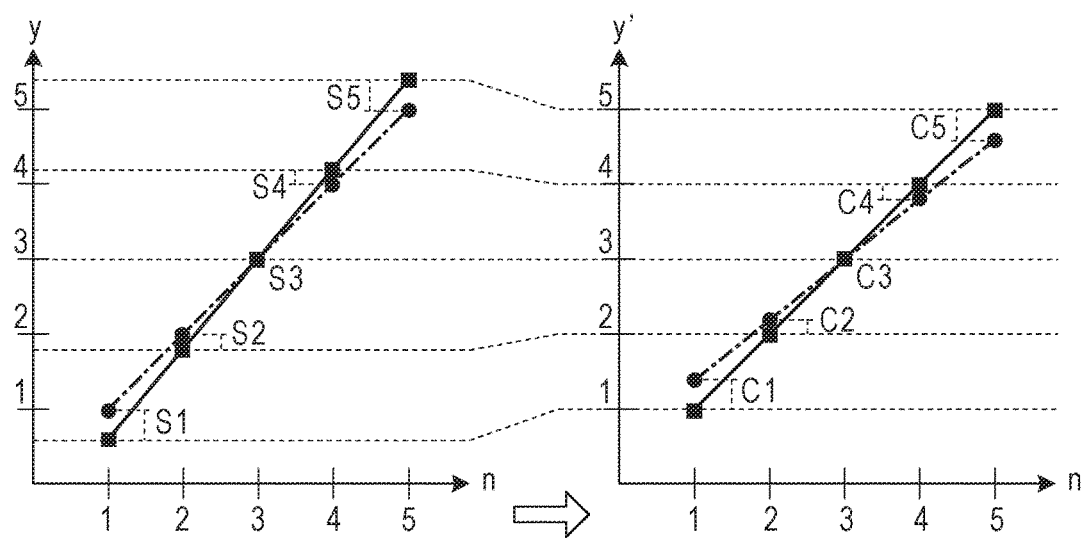

Here, coordinate conversion applicable to cases where a dense portion and a sparse portion of the scanning positions are generated as illustrated in FIGS. 11A and 11B and a case of a combination of the shift and dense/sparse portions in FIGS. 9A and 9B and FIGS. 11A and 11B will be described. FIG. 10A is a graph illustrating the relationship between a pixel number and a scanning position. An axis of abscissae denotes a pixel number n, an axis of ordinates y denotes a scanning position in the sub scanning direction, and rectangles denote scanning positions on the photoconductor drum 102. In FIG. 10A, a case where the scanning lines are positioned in a dense state on the photoconductor drum 102 in a range in which the pixel number n is equal to or smaller than 2 and the scanning lines are positioned in a sparse state on the photoconductor drum 102 in a range in which the pixel number n is equal to or larger than 2 will be described.

As illustrated in FIG. 10A, in the case of the dense state in the range in which the pixel number n is equal to or smaller than 2 and the sparse state in the range in which the pixel number n is equal to or larger than 2, an inclination of a straight line in the range in which the pixel number n is equal to or smaller than 2 is different from an inclination of a straight line in the range in which the pixel number n is equal to or larger than 2. Furthermore, a line is bent in a point in which the pixel number n is equal to 2. In FIG. 10A, a function indicating change of the scanning positions indicated by the rectangles is denoted by "ft(n)" and is represented by a solid line. The function ft(n) representing the scanning positions is represented by Expression (14) below.

$$y=ft(n) \qquad \text{Expression (14)}$$

Next, when a function obtained after the coordinate conversion on the y axis which is the scanning positions in the sub scanning direction is denoted by "ft'(n)", the functions ft'(n) representing the scanning positions after the coordinate conversion is represented by Expression (15) below.

$$y'=ft'(n) \qquad \text{Expression (15)}$$

In this embodiment, the coordinate conversion is performed by performing expansion and contraction in the y axis direction or performing shifting in the y axis direction so that the scanning positions after the coordinate conversion are uniformly positioned. Therefore, the function ft'(n) representing the scanning positions after the coordinate conversion satisfies a condition represented by Expression (16) below.

$$ft'(n)=n \qquad \text{Expression (16)}$$

Expression (16) means that, for the pixel number of 2, for example, a pixel position y' (=ft'(2)) in the sub scanning direction after the coordinate conversion is 2.

Dotted lines which connect FIG. 10A to FIG. 10B indicate correspondence between original coordinate positions in the y axis and the coordinate positions in a y' axis after the coordinate conversion from left to right, and a lower portion of the y axis (corresponding to n≤2) corresponds to expansion and an upper portion (corresponding to n≥2) corresponds to contraction. A procedure for obtaining coordinates after the coordinate conversion of the pixels of the input image data using the coordinate conversion illustrated in FIGS. 10A and 10B will be described with reference to FIGS. 10C and 10D. As with FIGS. 10A and 10B, axes of abscissae denote the pixel number n, axes of ordinates y (or y') denote the scanning positions in the sub scanning direction in FIGS. 10C and 10D, and the coordinate conversion has not been performed in FIG. 10C and has been performed in FIG. 10D. The relationship between the pixel number n and the coordinate position y of the input image data is illustrated as below. First, a dotted line in FIG. 10C denotes a function fs(n) which indicates the ideal scanning positions before the coordinate conversion and which is represented by Expression (17) below.

$$y=fs(n) \qquad \text{Expression (17)}$$

Furthermore, since the pixels of the input image data are arranged with even pitches in the sub scanned direction in this embodiment, the function fs(n) is represented by Expression (18) below.

$$fs(n)=n \qquad \text{Expression (18)}$$

A scanning position in the y' coordinate after the coordinate conversion is performed on a target pixel having a pixel number ns of the input image data is obtained by three steps below. In a first step, assuming that a y coordinate of an ideal scanning position corresponding to the pixel number ns of the input image data is denoted by "ys", the coordinate ys may be obtained by Expression (19) below.

$$ys=fs(ns) \qquad \text{Expression (19)}$$

A pixel number nt which is the same scanning position before the coordinate conversion on the photoconductor drum 102 (a solid line) is obtained ((1) of FIG. 10C). Here, the scanning position on the photoconductor drum 102 is represented by a function "y=ft(n)" and the relationship "ys=ft(nt)" is satisfied. Assuming that an inverse function of the function ft(n) is denoted by $ft^{-1}(y)$, the pixel number nt is represented by Expression (20) below.

$$nt = ft^{-1}(ys) \qquad \text{Expression (20)}$$

In a second step, a y' coordinate (yt) after the coordinate conversion corresponding to the pixel number nt of the scanning position on the photoconductor drum 102 is obtained by Expression (21) below using the function ft'(n) after the coordinate conversion ((2) of FIG. 10D).

$$yt = ft'(nt) \qquad \text{Expression (21)}$$

The pixel number ns may be arbitrarily selected, and therefore, an expression for obtaining the position yt on the y' coordinate after the coordinate conversion from the pixel number ns corresponds to the function fs'(n) for obtaining the y' coordinate as a calculation from the pixel number n of the input image data. Accordingly, a general expression represented by Expression (22) below may be obtained from Expressions (19) to (21). Note that the function indicating the ideal scanning positions denoted by the dotted line is represented as follows ((3) of FIG. 10D): y'=fs'(n).

$$yt = fs'(ns) = ft'(nt) = ft'(ft^{-1}(ys)) = ft'(ft^{-1}(fs(ns)))$$

When "ns" is generalized to "n", the following expression is obtained.

$$fs'(n) = ft'(ft^{-1}(fs(n))) \qquad \text{Expression (22)}$$

Furthermore, pitches between the pixels of the input image data and pitches between the scanning positions after the coordinate conversion are set uniform, that is, a distance of 1, and Expressions (18) and (16) are assigned to Expression (22). By this, Expression (22) is represented by Expression (23) using the inverse function $ft^{-1}(n)$ of the function ft(n) which guides a scanning position from the pixel number n.

$$fs'(n) = ft^{-1}(n) \qquad \text{Expression (23)}$$

Expression (9) in which the scanning positions illustrated in FIGS. 9A and 9B are uniformly shifted in the forward direction and the backward direction and Expression (12) in which positions after the coordinate conversion of the input image data are obtained have also the relationship of an inverse function, and accordingly, the Expression (23) may be satisfied. Furthermore, in a case where dense/sparse portions are generated in the scanning positions illustrated in FIGS. 11A and 11B, if a function y representing the scanning positions before the coordinate conversion is set as a straight line having an inclination k which passes a coordinate (n0, y0), the function y may be represented by Expression (24) below.

$$fs(n) = y = k \times (n - n0) + y0 \qquad \text{Expression (24)}$$

To obtain pixel positions in the y axis of the input image data after the coordinate conversion, an inverse function $((1/k) \times (y - y0) + n0)$ is obtained from Expressions (22) and (23) and the pixel number n is assigned to the inverse function. In this way, Expression (25) below is obtained.

$$y' = (1/k) \times (n - y0) + n0 \qquad \text{Expression (25)}$$

In the state in which the pitches between the scanning lines are dense as illustrated in FIG. 11A and the state in which the pitches between the scanning lines are spares as illustrated in FIG. 11B, positions of the scanning lines on the photoconductor drum 102 after the coordinate conversion may be represented by Expression (25). Furthermore, a correction value Cn of the pixel number n may be obtained from the following expression: Cn=fs'(n)−fs(n).

Specifically, in FIG. 11A, the following relationships are obtained: n0=y0=3 and k=0.8.

$$fs'(n) = (1/0.8) \times (n-3) + 3 \qquad \text{Expression (26)}$$

For example, as for a pixel number 3, an expression "fs's(3)=3.00" is satisfied and a correction value C3 is 0.00 (=3.00−3.00). Furthermore, as for a pixel number 5, an expression "fs'(5)=5.50" is satisfied and a correction value C5 is +0.50 (=+5.50−5.00). Correction values C1 to C5 in a case where the scanning positions are dense are illustrated in FIG. 13C.

Furthermore, in FIG. 11B, the following relationships are obtained: n0=y0=3 and k=1.2.

$$fs'(n) = (1/1.2) \times (n-3) + 3 \qquad \text{Expression (27)}$$

For example, in the pixel number 3, fs'(3) is 3.000 and a correction value C3 is 0.000 (=3.000−3.000). Furthermore, in the pixel number 5, fs'(5) is 4.667 and the correction value C5 is −0.333 (=4.667−5.000). Correction values C1 to C5 in a case where the scanning positions are sparse are illustrated in FIG. 13D.

Furthermore, even if dense/sparse portions and shifts are mixed in the scanning lines, the ideal scanning positions after the coordinate conversion may be obtained using Expressions (22) and (23). The correction value setting unit 506 performs the coordinate conversion on the ideal scanning positions based on the position shift amounts so as to obtain the correction values Cn and outputs information on the correction values Cn to the filter coefficient setting unit 504.

Filter Process

In this embodiment, the filter process is executed to generate correction data. Note that, in this embodiment, the filter process unit 501 performs the filter process by a convolution calculation using a filter function as described below. Specifically, the filter process unit 501 performs the filter process based on the positional relationship between positions of the pixels in the sub scanning direction obtained after the correction of the scanning positions in the sub scanning direction of the pixels of the input image data and positions of the pixels in the sub scanning direction obtained by converting the pitches of the scanning lines to be uniform through the coordinate conversion. Note that the pixels which have not been subjected to the filter process are also referred to as "input pixels" and pixels which have subjected to the filter process are also referred to as "output pixels". Furthermore, the pixels which have not been subjected to the filter process correspond to the pixels which have been subjected to the coordinate conversion described above.

Figure 12A:
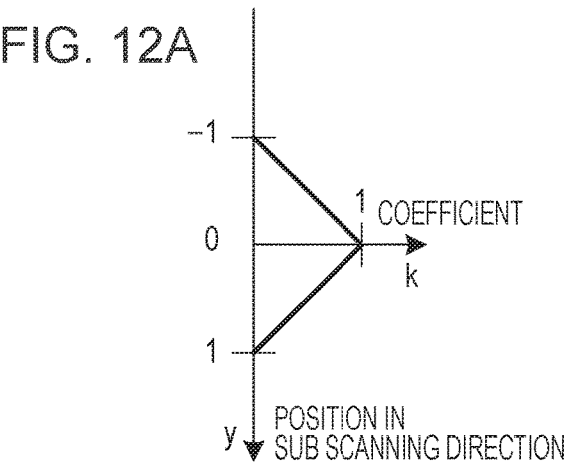
FIGS. 12A to 12C are diagrams illustrating convolution functions used in a filter process according to the first embodiment.
Figure 12B:
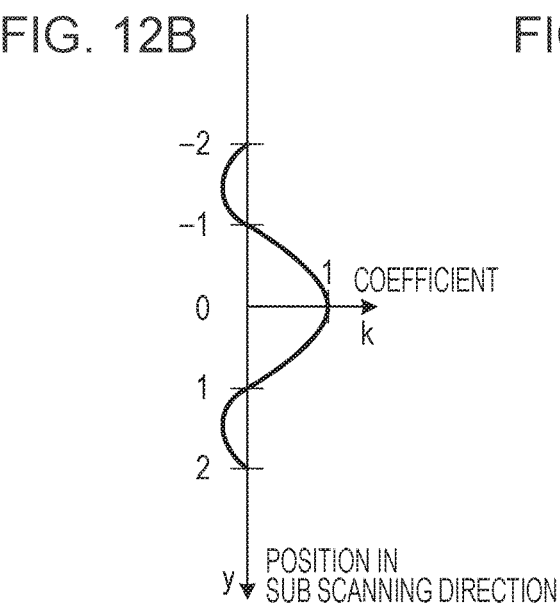
Figure 12C:
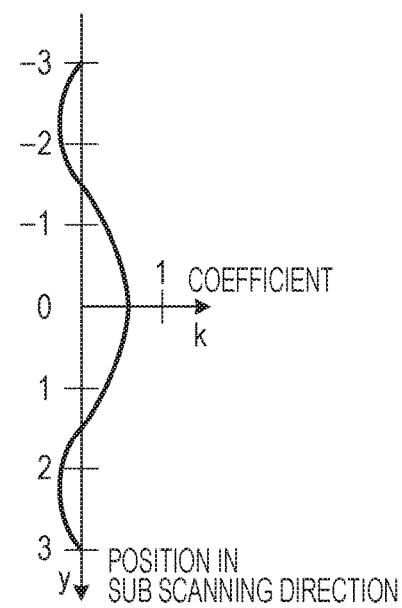

The convolution function of this embodiment may be selected from among linear interpolation illustrated in FIG. 12A, bicubic interpolation of FIG. 12B, and bicubic interpolation of FIG. 12C. The filter function output unit 505 outputs information on the convolution function used in the filter process to the filter coefficient setting unit 504 as table information, for example. In FIGS. 12A to 12D, axes of ordinates y denote a position in the sub scanning direction and a unit is a pixel. Axes of abscissae k denote a magnitude of a coefficient. Although the unit of the ordinate axes y is a pixel, the unit may be a line since the line indicates the sub scanning direction.

FIG. 12A is represented by the following expressions.

$$k = y + 1 \quad (-1 \le y \le 0)$$

$$k = -y + 1 \quad (0 < y \le 1)$$

$$0 \quad (y < -1, y > 1) \qquad \text{Expression (28)}$$

FIGS. 12B and 12C are represented by two expressions below.

Although "a" is −1, "w" is 1 in FIG. 12B, and "w" is 1.5 in FIG. 12C in this embodiment, "a" and "w" may be adjusted in accordance with an electrophotographic characteristic of the image forming apparatuses. The filter coefficient setting unit 504 outputs the coefficient ("k" described below) used in the filter process based on information on the filter coefficient obtained from the filter function output unit 505 and information on the correction value C output from the correction value setting unit 506 to the filter process unit 501.

$$\text{bicubic}(t) = \begin{cases} (a+2)|t|^3 - (a+3)|t|^2 + 1 & (|t| \le 1) \\ a|t|^3 - 5a|t|^2 + 8a|t| - 4a & (1 < |t| \le 2) \\ 0 & (2 < |t|) \end{cases} \quad \text{Expression (29)}$$

$$k = \text{bicubic}\left(\frac{y}{w}\right) / w \quad \text{Expression (30)}$$

Figure 12D:
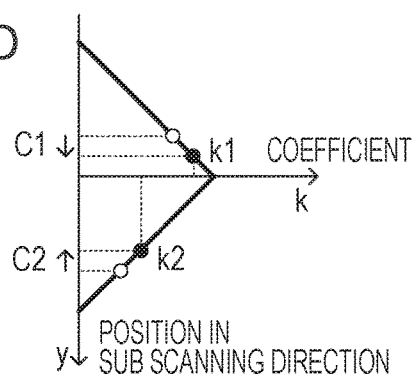
FIG. 12D is a diagram illustrating a correction value and a coefficient.

Here, a description will be made with reference to FIG. 12D. In FIG. 12D, an axis of abscissae denotes the coefficient k used in the filter process and an axis of ordinates denotes the position y in the sub scanning direction. The filter process unit 501 obtains a coefficient kn corresponding to the correction value Cn using the filter function input from the filter function output unit 505 when receiving the correction value Cn from the correction value setting unit 506. Note that white circles in FIG. 12D denote coefficients before the coordinate conversion. In FIG. 12D, a coefficient k1 is set for a correction value C1 and a coefficient k2 is set for a correction value C2 as the coefficient kn used in the filter process (black circles). In this embodiment, the same convolution function is employed irrespective of a dense/sparse state of the input image data, and sampling is performed using the ideal scanning positions so that density per a certain area of the input image data is stored.

Concrete Example of Filter Process

A concrete example of the filter process using the convolution calculation of the filter function by linear interpolation of Expression (28) based on coordinate positions obtained after the coordinate conversion of this embodiment will be described with reference to FIGS. 13A to 13D. Note that the filter process using the convolution calculation is executed by the filter process unit 501. FIGS. 13A to 13D correspond to FIGS. 8A to 8D, respectively. Columns on left sides in FIGS. 13A to 13D indicate input pixels after the coordinate conversion described above. The input pixels are included in the image data subjected to the dither process in step S606 of FIG. 5, and includes pixels having density values of a halftone. Furthermore, columns on right sides in FIGS. 13A to 13D indicate scanning positions on the photoconductor drum 102 after the coordinate conversion described above. Specifically, the scanning positions in the columns on the right sides in FIGS. 13A to 13D are subjected to the coordinate conversion so as to be arranged at even pitches of a distance of 1.

More specifically, the scanning positions in the sub scanning direction of the input pixels after the coordinate conversion are represented by straight lines (y'=fs'(n)) denoted by the chain lines in the graphs obtained after the coordinate conversion illustrated on the right sides in FIGS. 9A, 9B, 11A, and 11B. The scanning positions on the photoconductor drum 102 after the coordinate conversion are represented by straight lines (y'=ft'(n)) denoted by the solid lines in the graphs obtained after the coordinate conversion illustrated on the right sides of FIGS. 9A, 9B, 11A, and 11B. For example, since a shift amount is +0.2 (=S) in FIG. 9A, the scanning positions on the photoconductor drum 102 after the coordinate conversion are represented by "fs'(n)=y−0.2=n−0.2".

Furthermore, in FIGS. 13A to 13D, magnitudes of pixel values, that is, density values, are denoted by gradation of circles. Furthermore, numbers in brackets indicate numbers of the scanning lines and are the same as the pixel numbers illustrated in FIGS. 8A to 8D. In graphs in centers of FIGS. 13A to 13D, axes of abscissae denote density and axes of ordinates denote a position in the sub scanning direction. In the convolution calculation, waveforms W (W1 to W5 corresponding to the pixels (1) to (5)) obtained by multiplying the filter function (FIG. 12A) having the coordinate positions of the input pixels at a center by the pixel values are developed and overlap with one another for addition.

A description will be made in turn from FIG. 13A. The pixels (1) and (5) denoted by white circles have a density of 0, that is, a pixel value of 0. Therefore, W1 and W5 obtained by multiplying the filter function by the pixel values are both 0. Densities of the pixels (2), (3), and (4) denoted by black circles are the same, largest values of waveforms of W2, W3, and W4 are the same, and the waveforms are obtained by developing the filter function using the pixel positions of the input pixels at centers. A total sum (ΣWn, n=1 to 5) of all the waveforms is obtained as a result of the convolution calculation.

The pixel values of the output pixels are sampled in the scanning positions on the photoconductor drum 102 after the scanning positions are subjected to the coordinate conversion. Therefore, the pixel value (1) corresponding to the scanning position on the photoconductor drum 102 intersects with the waveform W2 at a point P0, for example, and therefore, a density D1 is obtained. Furthermore, the pixel value (2) intersects with the waveform W2 at a point P2 and intersects with the waveform W3 at a point P1, and therefore, a density of D1+D2 is obtained. Thereafter, densities of the pixel values (3) to (5) are similarly obtained. Note that the pixel value (5) does not intersect with any waveform, and therefore, a pixel value is 0. Furthermore, results of calculations of the pixel values (1) to (5) in FIGS. 13B to 13D are denoted by gradation of the pixels in the columns on the right sides.

Position shifts of the input pixels correspond to the pixels in the axes of ordinates in FIGS. 13A to 13D. The position shift amounts in the axes of ordinates in FIGS. 13A to 13D are information on position shift amounts obtained by the inverse function in accordance with the coordinate conversion on the scanning positions in the sub scanning direction of the pixels of the input image described above. For example, in the case of FIG. 13A, as described with reference to FIG. 9A, the correction amount C for the position shift amount S of the scanning lines is −0.2. Furthermore, the correction amount C is calculated using Expression (26) in the case of FIG. 13C and Expression (27) in the case of FIG. 13D.

Figure 13A:
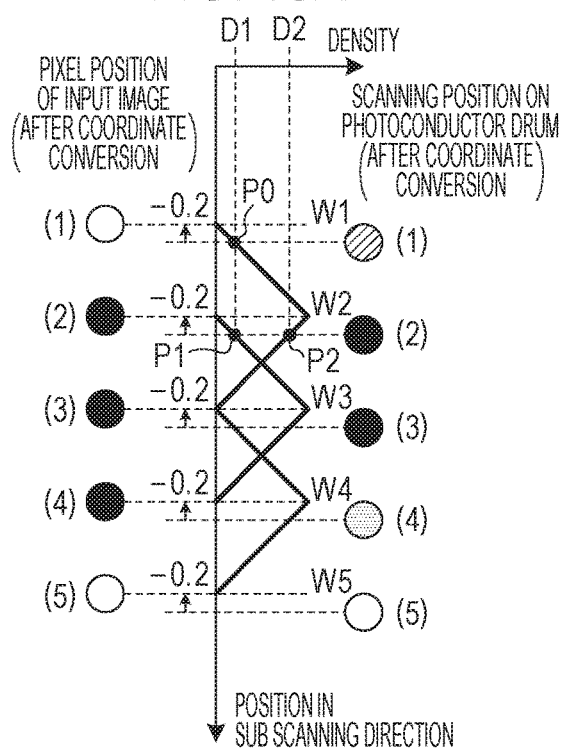
FIGS. 13A to 13D are diagrams illustrating the filter process for individual classifications of the position shifts according to the first embodiment.
Figure 13B:
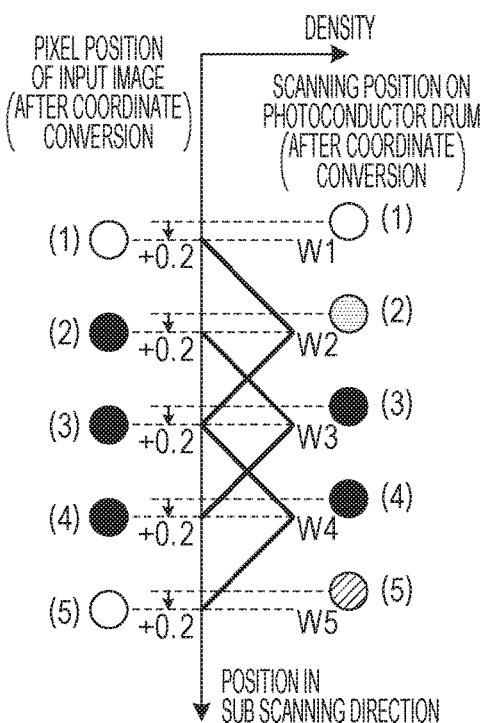
Figure 13C:
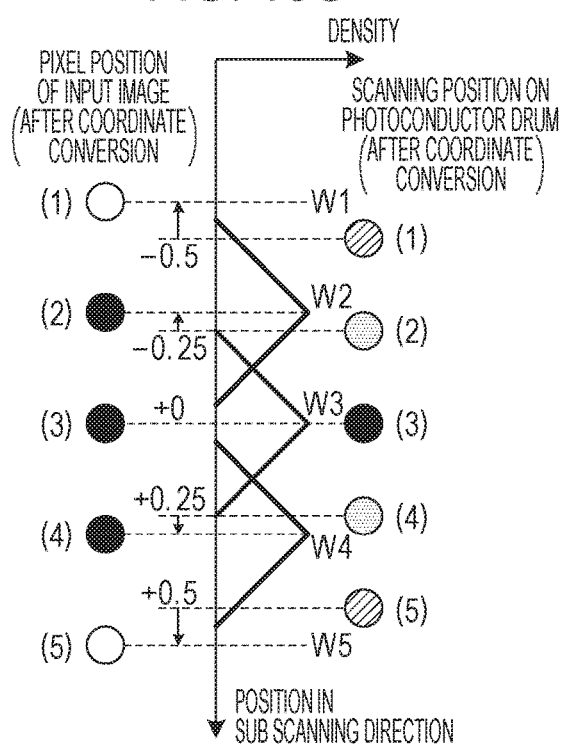
Figure 13D:
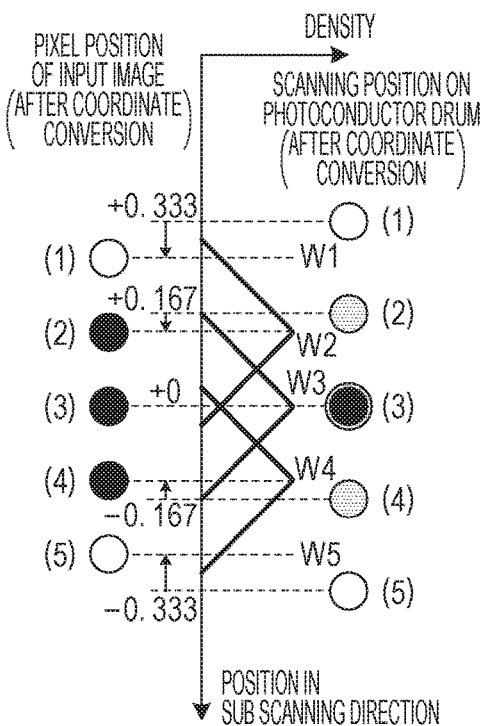

FIG. 13A is a diagram illustrating a state in which although the scanning positions of the scanning lines are shifted in the forward direction in the sub scanning direction, centers of the pixel values are conversely shifted in the backward direction, and accordingly, positions of the centers of the pixel values are corrected. FIG. 13B is a diagram illustrating a state in which although the scanning positions of the scanning lines are shifted in the backward direction in the sub scanning direction, centers of the pixel values are conversely shifted in the forward direction, and accordingly, positions of the centers of the pixel values are corrected. FIG. 13C is a diagram illustrating a state in which the pitches of the scanning positions are dense, density distribution spreads due to the convolution calculation after the coordinate conversion, local concentration in density is cancelled, and local density change is corrected. Furthermore, FIG. 13D is a diagram illustrating a state in which the pitches of the scanning positions are conversely sparse, density distribution contracts due to the convolution calculation after the coordinate conversion, the density spread is cancelled, and local density change is corrected. The pixel value (3) of FIG. 13D has a density (100+α)% higher than a density of 100%.

Filter Process

Figure 14:
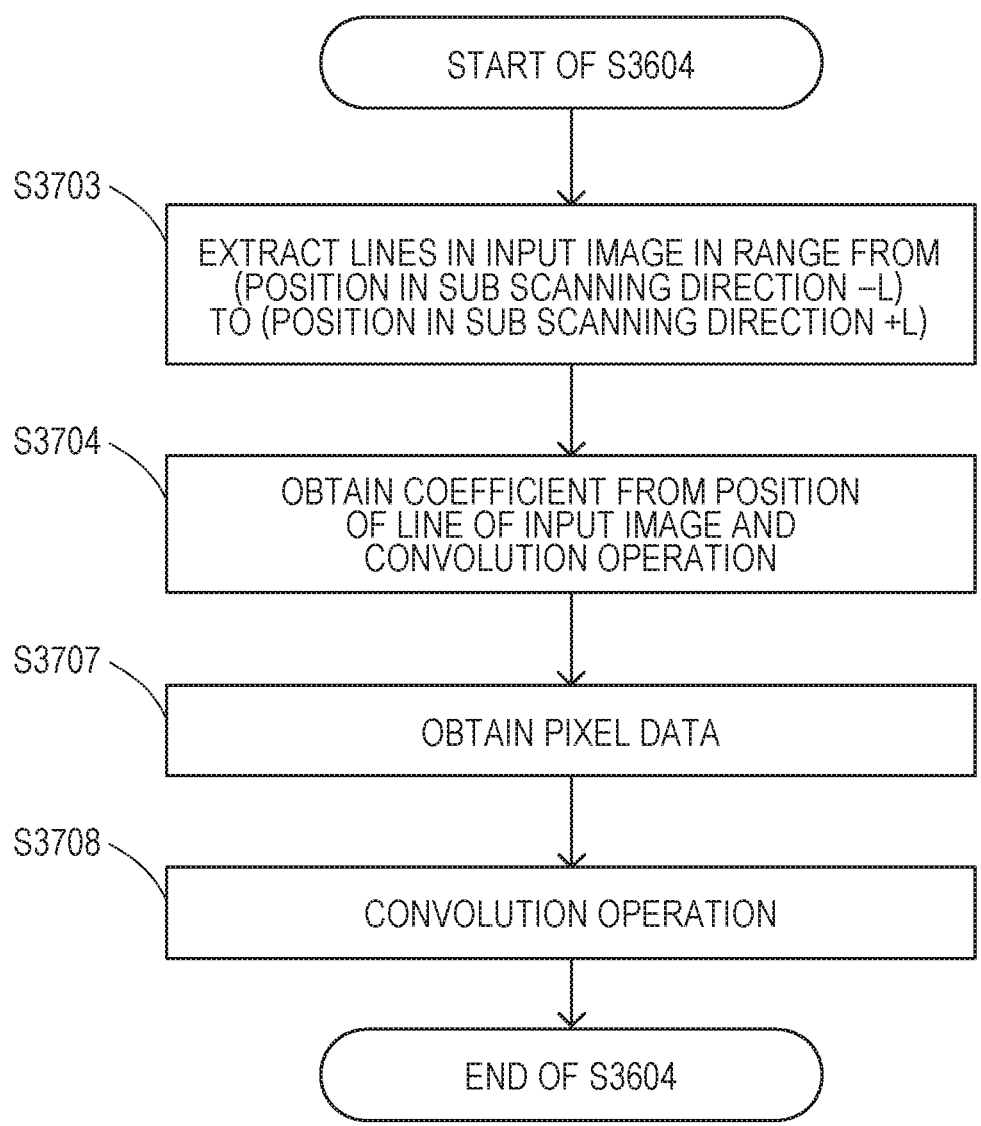
FIG. 14 is a flowchart illustrating the filter process according to the first embodiment.

Referring back to FIG. 7, in step S3604, the CPU 303 performs the filter process using the filter process unit 501 in accordance with the correction attribute information generated in step S3603. Specifically, the CPU 303 performs the convolution calculation and re-sampling on the input image described above. Here, the process in step S3604 executed by the CPU 303 will be described in detail with reference to a flowchart of FIG. 14.

When starting the filter process using the convolution calculation using the filter process unit 501, the CPU 303 executes a process in step S3703 onwards. In step S3703, when it is assumed that the spread of the convolution function is denoted by "L", the CPU 303 extracts lines of the input image included in a range ±L of the sub scanning position of a line yn (a position yn) in a target output image, that is, a range of a width of 2L (a range from (yn−L) to (yn+L)). Here, the value L is defined as a smallest value which attains a value of the convolution function of 0 out of the range ±L of the convolution function. For example, L is 1 in the linear interpolation in FIG. 12A, L is 2 in the bicubic interpolation in FIG. 12B, and L is 3 in the bicubic interpolation in FIG. 12C. Using Expression (23), "ymin" and "ymax" of a range from ymin to ymax of the corresponding input image satisfy the following condition.

$$ft^{-1}(ymin)=yn-L, ft^{-1}(ymax)=yn+L \quad \text{Expression (31)}$$

By deforming Expression (31), "ymin" and "ymax" are obtained using Expression (32) below.

$$ymin=ft(yn-L), ymax=ft(yn+L) \quad \text{Expression (32)}$$

Accordingly, lines of the input image extracted for the lines yn of the target output image are all integer lines in the range from ymin to ymax.

When the lines of the target output image are denoted by "yn" and the lines of the input image which is a target of the convolution calculation which are denoted by "ym", distances dnm are represented by Expression (33) below.

$$dnm=yn-ft^{-1}(ym) \quad \text{Expression (33)}$$

Accordingly, in step S3704, the CPU 303 obtains a coefficient knm as a convolution function g(y) using the filter coefficient setting unit 504 in accordance with Expression (34) below.

$$knm=g(dnm) \quad \text{Expression (34)}$$

In step S3707, the CPU 303 obtains a position n in the sub scanning direction of the input image extracted in step S3703 and image data in a target position N in the main scanning direction. Here, it is assumed that pixel data corresponds to input pixel data Pinm. In step S3708, the CPU 303 calculates the convolution calculation using the filter process unit 501 and terminates the process. More specifically, the filter process unit 501 performs a product-sum operation using the corresponding coefficient knm obtained in step S3704 and the input pixel data Pinm obtained in step S3707 so as to obtain a value Poutn of a target pixel. Note that the input pixel data Pinm indicates density of the target pixel before the filter process, and the value Poutn of the target pixel indicates density of the target pixel after the filter process which is output pixel data.

$$Pout_n = \sum_{m}^{all} k_{nm} \cdot Pin_m \quad \text{Expression (35)}$$

Here, Expression (35) corresponds to FIGS. 13A to 13D, color strength (density) of the circles on the left sides in FIGS. 13A to 13D correspond to the input pixel data Pinm, D1 and D2 in FIG. 13A correspond to knm×Pinm, and color strength (density) of the circles on the right sides in FIGS. 13A to 13D correspond to Poutn.

In this way, according to this embodiment, distortion and density unevenness of an image caused by shifts of irradiation positions due to variation of positions of the multi-beam and the plane tilt of the rotatable polygonal mirror are corrected by performing the coordinate conversion on the pixel positions of the input image based on a selected dither and a profile of the position shifts in the sub scanning direction of the input image. Thereafter, by performing the filter process and the sampling, local density concentration, such as position shifts and banding, may be cancelled while density of the input pixels is stored, and accordingly, an excellent image may be obtained.

As described above, according to this embodiment, the plane tilt correction may be appropriately performed irrespective of an image pattern.

Second Embodiment

In the first embodiment, the correction amount for the position shift amount is determined depending on a type of dither to be used. In a second embodiment, a correction amount for a position shift amount is determined in accordance with a type of a dither to be used and image density. Although a configuration of an image forming apparatus and basic configurations of a control sequence of a page process are the same as those in the first embodiment, the process in step S3602 in FIG. 7 of the first embodiment for calculating a correction amount based on a position shift amount is different. Components the same as those of the first embodiment are denoted by reference numerals the same as those of the first embodiment, and detailed descriptions thereof are omitted.

Plane Tilt Correction Process

In FIG. 5 described above, a CPU 303 executes the control sequence illustrated in FIG. 7 so as to perform a plane tilt correction process in step S607 after terminating the dither process in step S606. FIG. 7 is a control sequence for performing the plane tilt correction process. The CPU 303 reads position shift amounts in a sub scanning direction, that is, position shift amounts Zmn of scanning lines (LDn) of n-th laser light of multi-beam and m-th mirror plane of a rotatable polygonal mirror 204 in step S3602. Subsequently, the CPU 303 selects a plane tilt correction table corresponding to a dither selected in step S603 to step S605 of FIG. 5 described above. The correction table stores information on association between density of an image and a correction amount for a plane tilt amount for each plane tilt amount.

The CPU 303 includes a storage unit which stores correction tables corresponding to dithers A to C.

Figure 15A:
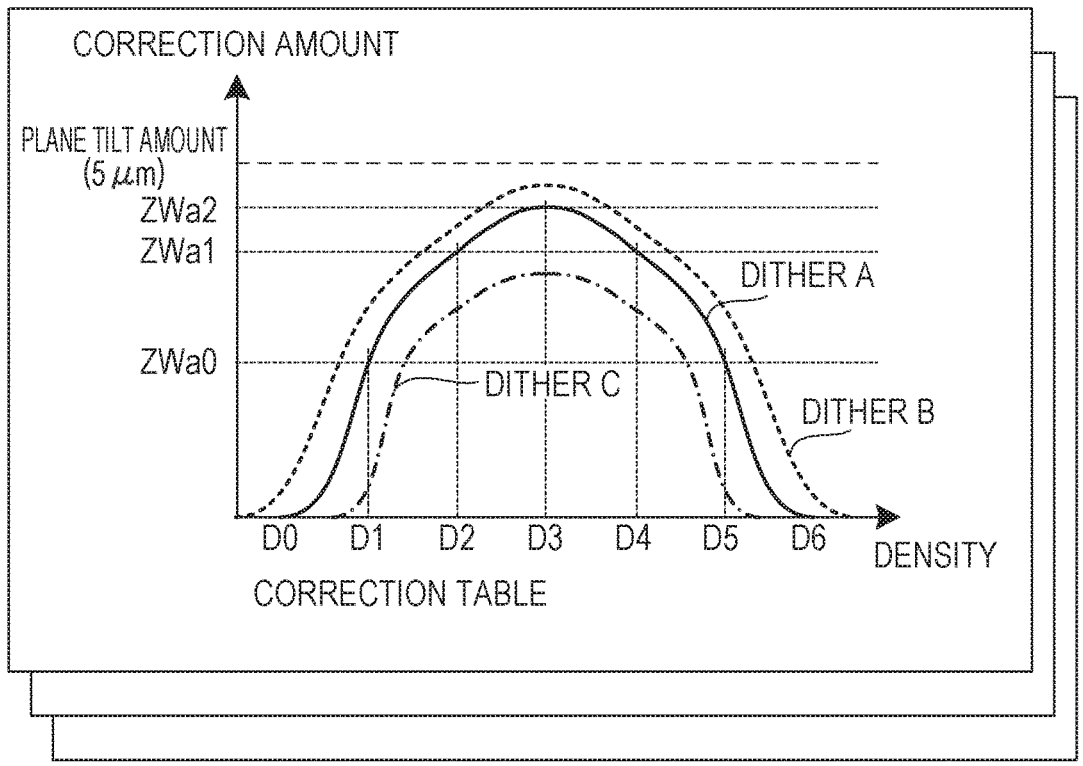
FIGS. 15A and 15B are plane tilt correction tables according to a second embodiment.
Figure 15B:
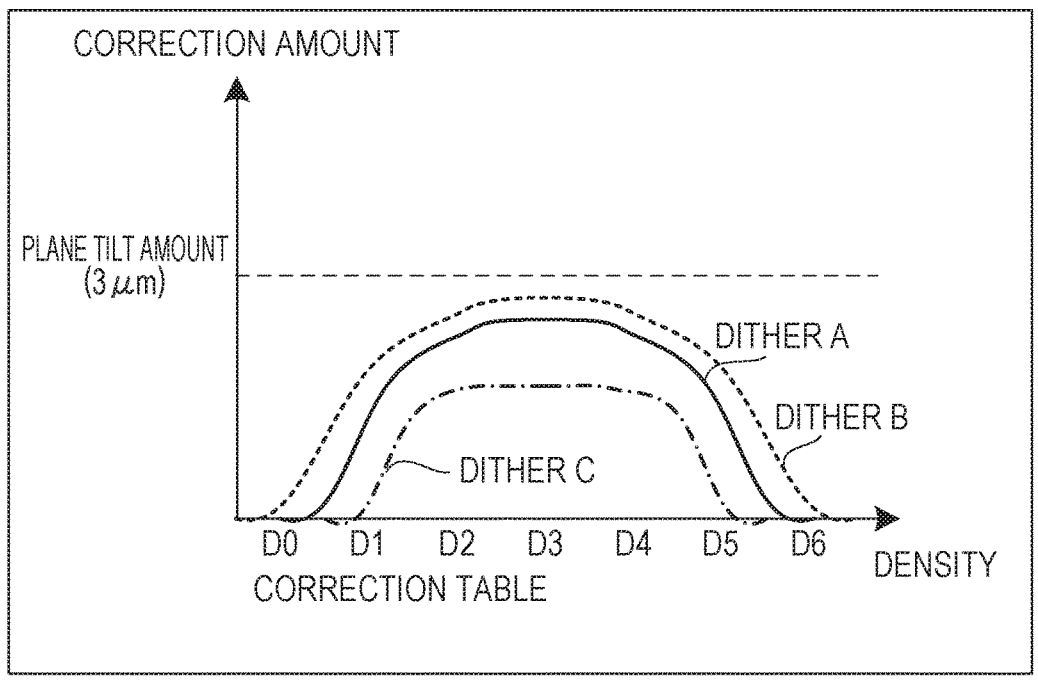

FIGS. 15A and 15B are diagrams illustrating content of the plane tilt correction tables for individual dithers of this embodiment as one graph for description. FIGS. 15A and 15B are examples of the correction tables of the dithers in a case of plane tilt amounts of 5 µm and 3 µm, respectively. In FIGS. 15A and 15B, axes of abscissae denote density and axes of ordinates denote a correction amount. Furthermore, in FIGS. 15A and 15B, graphs denoted by solid lines indicate the content of the correction table of the dither A, graphs denoted by dotted lines indicate the content of the correction table of the dither B, and graphs denoted by chain lines indicate the content of the correction table of the dither C. Furthermore, "D0" to "D6" in the axes of abscissae indicate density of an image, and the density becomes higher (a density value is increased) in order from D0 to D6. In a case where a plane tilt amplitude amount ZW calculated by Expression (23) described above is 5 µm, for example, the CPU 303 selects a correction table for the plane tilt amount of 5 µm from among a plurality of correction tables and selects a curve for a selected dither for each pixel. In this case, the CPU 303 selects the graph of FIG. 15A, and if the dither A is selected as a dither to be used, a correction amount for the plane tilt amount is determined in accordance with image density of a target pixel. The image density of the pixel in this case is obtained before the dither process is executed in step S606 of FIG. 5.

According to the graph of FIG. 15A, when the dither A is selected, a correction value for the plane tilt amount of 5 µm in a case where the image density is D0 or D6 is determined to 0 and a correction value for the plane tilt amount of 5 µm in a case where the image density is D1 or D5 is determined to ZWa0. Furthermore, according to the graph of FIG. 15A, when the dither A is selected, a correction value for the plane tilt amount of 5 µm in a case where the image density is D2 or D4 is determined to ZWa1 and a correction value for the plane tilt amount of 5 µm in a case where the image density is D3 is determined to ZWa2. In this embodiment, the CPU 303 determines, as with the first embodiment, the plane tilt amplitude amount ZW in accordance with Expression (23) described above. Then the CPU 303 calculates a position shift amount Zmn' after correction using Expression (24) described above when the dither A is selected and a correction amount in a case where the plane tilt amount is ZW and image density is D1 is ZWa0. Then the CPU 303 obtains a correction amount Cmn serving as correction attribute information based on the position shift amount Zmn' after the correction in step S3603. Thereafter, in step S3604, the CPU 303 performs the filter process using the filter process unit 501 based on the correction attribution information generated by the process described above.

As described above, a correction amount for a position shift amount is determined using a combination between a type of dither and image density in this embodiment. Accordingly, moire caused by the plane tilt may be corrected and large electrophotographic environmental variation, such as temperature variation and humidity variation, may be coped with.

As described above, according to this embodiment, the plane tilt correction may be appropriately performed irrespective of an image pattern.

According to the aspect of the embodiments, the plane tilt correction may be appropriately performed irrespective of an image pattern.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-228744, filed in Nov. 24, 2015, which is hereby incorporated by reference herein in its entirety.

What is claimed is:

1. An image forming apparatus comprising:
   a light source configured to emit a light beam;
   a photoreceptor configured to be driven for rotation on which a latent image is formed by the light beam;
   a rotatable polygonal mirror configured to rotate about a rotation axis and have a plurality of mirror planes which deflect the light beam so that the light beam scans the photoreceptor;
   a processing unit configured to perform a dither process on input image data; and
   a correction unit configured to correct image data which has been subjected to the dither process using correction amounts based on inclinations of the plurality of mirror planes relative to the rotation axis of the rotatable polygonal mirror,
   wherein the light source emits the light beam for forming the latent image based on the corrected image data, and the correction unit determines the correction amounts in accordance with a type of the dither process.

2. The image forming apparatus according to claim 1, wherein the dither includes a line screen, a dot screen, and error diffusion.

3. The image forming apparatus according to claim 1, wherein the correction amounts corresponding to the type of the dither process are determined in accordance with amounts of shifts of scanning lines of the light beam deflected by the plurality of mirror planes from positions of ideal scanning lines in a rotation direction of the photoreceptor, amounts of amplitude of the scanning lines formed by the light beam reflected by the mirror planes from the ideal scanning lines in the rotation direction of the photoreceptor, and correction values for correcting the shift amounts corresponding to image density which are the amplitude amounts of the image data which has been subjected to the dither process.

4. The image forming apparatus according to claim 3, further comprising:
   a storage unit configured to store information,
   wherein the storage unit stores information on the amounts of shifts of the scanning lines of the light beam deflected by the plurality of mirror planes from the positions of the ideal scanning lines in the rotation direction of the photoreceptor and information on the correction values for correcting the amounts of shifts relative to the positions of the ideal scanning lines depending on the type of the dither process and depending on image density of the image data which has been subjected to the dither process.

5. The image forming apparatus according to claim 4, wherein the image density corresponds to density of the image data which has not been subjected to the dither process.

6. The image forming apparatus according to claim 1, wherein the correction amounts corresponding to the type of the dither process are determined in accordance with amounts of shifts of scanning lines of the light beam deflected by the plurality of mirror planes from positions of ideal scanning lines in a rotation direction of the photoreceptor, amounts of amplitude of the scanning lines formed by the light beam reflected by the mirror planes from the ideal scanning lines in the rotation direction of the photoreceptor, and correction values for correcting the shift amounts which are the amplitude amounts of the image data which has been subjected to the dither process.

7. The image forming apparatus according to claim 6, wherein the amplitude amounts are differences between largest values and smallest values of the amounts of shifts of the scanning lines formed by the light beam reflected by the mirror planes relative to the positions of the ideal scanning lines in the rotation direction of the photoreceptor.

8. The image forming apparatus according to claim 6, further comprising:
   a storage unit configured to store information,
   wherein the storage unit stores information on the amounts of shifts of the scanning lines of the light beam deflected by the plurality of mirror planes from the positions of the ideal scanning lines in the rotation direction of the photoreceptor and information on the correction values for correcting the amounts of shifts of the image data which has been subjected to the dither process for types of the dither process from the positions of the ideal scanning lines.

9. The image forming apparatus according to claim 8, wherein the correction unit performs a filter process of obtaining pixel values of pixels of an output image by converting positions of pixels of an input image through coordinate conversion such that the scanning lines are arranged at a certain pitch on the photoreceptor in accordance with the correction amounts corresponding to the type of the dither process and performing a convolution calculation on pixel values of the pixels of the input image in accordance with positions of the pixels of the input image obtained after the coordinate conversion.

10. The image forming apparatus according to claim 9, wherein the correction unit obtains the positions of the pixels of the input image after the coordinate conversion using an inverse function $ft^{-1}(n)$ of a function $ft(n)$ from the following expression: $fs'(n)=ft'(ft^{-1}(fs(n)))$
   wherein
      $fs(n)$ denotes a function indicating a position of an n-th pixel of the input image in the rotation direction of the photoreceptor,
      $ft(n)$ denotes a function indicating a position of an n-th pixel of the output image in the rotation direction of the photoreceptor,
      $fs'(n)$ denotes a function indicating a position of an n-th pixel of the input image after the coordinate conversion in the rotation direction of the photoreceptor, and
      $ft'(n)$ denotes a function indicating a position of an n-th pixel of the output image after the coordinate conversion in the rotation direction of the photoreceptor.

11. The image forming apparatus according to claim 10, wherein, when the function $fs(n)$ satisfies "$fs(n)=n$" and the function $ft'(n)$ satisfies "$ft'(n)=n$", the correction unit obtains the positions of the pixels of the input image after the coordinate conversion in accordance with the following expression: $fs'(n)=ft^{-1}(n)$.

12. The image forming apparatus according to claim 9, wherein the correction unit performs the convolution calculation using linear interpolation or bicubic interpolation.

13. The image forming apparatus according to claim 9, wherein the pixel values correspond to density values, and density values per a predetermined area are stored before and after the convolution calculation.

14. The image forming apparatus according to claim 9, wherein the correction unit defines a range from ymin to ymax of the pixels of the input image corresponding to a range of a width of 2L which is a width of a range in which a convolution function used for the convolution calculation is not 0 in the rotation direction of the photoreceptor and which has a position yn of a predetermined pixel of the input image as a center as follows:

$$y\text{min}=ft(yn-L) \text{ and}$$

$$y\text{max}=ft(yn+L).$$

15. The image forming apparatus according to claim 9, wherein the information stored in the storage unit further includes information on variation in angles of mirror planes relative to the rotation axis of the rotation polygonal mirror.

16. The image forming apparatus according to claim 9, wherein the certain pitch is determined in accordance with resolution of image formation performed by the image forming apparatus.

* * * * *